(12) United States Patent
Oota

(10) Patent No.: US 12,326,187 B2
(45) Date of Patent: Jun. 10, 2025

(54) UNIT WITH A COVERING AND A HEAT EXCHANGER

(71) Applicant: JATCO Ltd, Fuji (JP)

(72) Inventor: Yusuke Oota, Ebina (JP)

(73) Assignee: JATCO LTD, Shizuoka (JP)

( * ) Notice: Subject to any disclaimer, the term of this patent is extended or adjusted under 35 U.S.C. 154(b) by 0 days.

(21) Appl. No.: 18/561,395

(22) PCT Filed: May 26, 2022

(86) PCT No.: PCT/JP2022/021496
§ 371 (c)(1),
(2) Date: Nov. 16, 2023

(87) PCT Pub. No.: WO2022/270214
PCT Pub. Date: Dec. 29, 2022

(65) Prior Publication Data
US 2024/0229916 A1 Jul. 11, 2024

(30) Foreign Application Priority Data
Jun. 24, 2021 (JP) .................................. 2021-105244

(51) Int. Cl.
*F16H 57/02* (2012.01)
*F16H 57/028* (2012.01)
(Continued)

(52) U.S. Cl.
CPC ......... *F16H 57/028* (2013.01); *F16H 57/031* (2013.01); *F16H 57/0415* (2013.01);
(Continued)

(58) Field of Classification Search
CPC .. F16H 57/028; F16H 57/031; F16H 57/0413; F16H 57/0415; F16H 57/0476;
(Continued)

(56) References Cited

U.S. PATENT DOCUMENTS 4,848,453 A * 7/1989 Evans ................. F16H 57/0415
165/44
4,872,502 A * 10/1989 Holzman ............ F16H 57/0415
165/47
(Continued)

FOREIGN PATENT DOCUMENTS

JP S62-173226 U 11/1987
JP 2006117338 A * 5/2006 ......... F16H 57/0415
(Continued)

OTHER PUBLICATIONS

Machine translation of JP 2006-117338 A obtained on Oct. 17, 2024.*

Primary Examiner — Adam D Rogers
(74) Attorney, Agent, or Firm — Foley & Lardner LLP

(57) ABSTRACT

Provided is a unit including: a heat exchanger; a housing configured to accommodate a power transmission mechanism; and a covering having a portion that covers the housing, in which the heat exchanger has a portion offset from the covering when viewed in a radial direction, and the heat exchanger has a portion that overlaps the covering when viewed in the radial direction.

7 Claims, 14 Drawing Sheets

(51) Int. Cl.
*F16H 57/031* (2012.01)
*F16H 57/04* (2010.01)

(52) U.S. Cl.
CPC .............. *F16H 2057/02026* (2013.01); *F16H 2057/02034* (2013.01)

(58) Field of Classification Search
CPC ............ F16H 2057/02026; F16H 2057/02034; H02K 5/04; H02K 5/08
See application file for complete search history.

(56) References Cited

U.S. PATENT DOCUMENTS

| | | | |
|---|---|---|---|
| 5,193,415 A * | 3/1993 | Massel | F16H 57/031 74/606 R |
| 7,775,060 B2 | 8/2010 | Nakajima et al. | |
| 7,946,366 B2 * | 5/2011 | Kano | B60L 50/61 903/952 |
| 11,079,004 B2 * | 8/2021 | Ishikawa | F16H 57/0476 |
| 11,318,895 B2 * | 5/2022 | Kato | F01N 1/023 |
| 2008/0258569 A1 | 10/2008 | Kano et al. | |
| 2020/0328652 A1 * | 10/2020 | Miki | F16H 57/0412 |
| 2024/0227548 A1 * | 7/2024 | Oota | B60K 17/16 |
| 2024/0229920 A1 * | 7/2024 | Oshidari | F16H 57/0424 |
| 2024/0239183 A1 * | 7/2024 | Matsukura | B60K 11/02 |
| 2024/0271691 A1 * | 8/2024 | Oota | F16H 57/0412 |
| 2024/0278636 A1 * | 8/2024 | Yokoyama | F16H 57/0424 |
| 2024/0288062 A1 * | 8/2024 | Uehara | F16H 57/0412 |

FOREIGN PATENT DOCUMENTS

| | | | | |
|---|---|---|---|---|
| JP | 2008-267465 A | | 11/2008 | |
| JP | 2018-050385 A | | 3/2018 | |
| JP | 2019015192 A | * | 1/2019 | |
| JP | 2021008901 A | * | 1/2021 | ............. B60K 17/04 |

* cited by examiner

UNIT WITH A COVERING AND A HEAT EXCHANGER

TECHNICAL FIELD

The present invention relates to a unit.

BACKGROUND ART

A unit mounted on a vehicle includes a housing that accommodates a motor and a power transmission mechanism. Patent Document 1 discloses providing a covering as a soundproof member to reduce noise generated from a motor. Patent Document 2 discloses providing a covering outside a housing.

PRIOR ART DOCUMENT

Patent Document

Patent Document 1: JP 2018-50385 A
Patent Document 2: JP 2008-267465 A

SUMMARY OF INVENTION

When the motor and rotating elements of the power transmission mechanism rotate, heat is generated in the housing. When the housing is covered with a covering, heat is likely to accumulate therein.

It is required to implement both a heat countermeasure and a noise countermeasure in the housing.

According to one aspect of the present invention, a unit includes:
a heat exchanger;
a housing configured to accommodate a power transmission mechanism; and
a covering having a portion that covers the housing, wherein
the heat exchanger has a portion offset from the covering when viewed in a radial direction, and
the heat exchanger has a portion that overlaps the covering when viewed in the radial direction.

According to one aspect of the present invention, a unit includes:
a heat exchanger;
a housing configured to accommodate a power transmission mechanism; and
a covering having a portion that covers the housing, wherein
the heat exchanger has a portion offset from the covering when viewed in a radial direction, and
the covering has a portion that overlaps the power transmission mechanism when viewed in the radial direction.

According to an aspect of the present invention, both the heat countermeasure and the noise countermeasure can be implemented.

DESCRIPTION OF EMBODIMENTS

Figure 1:
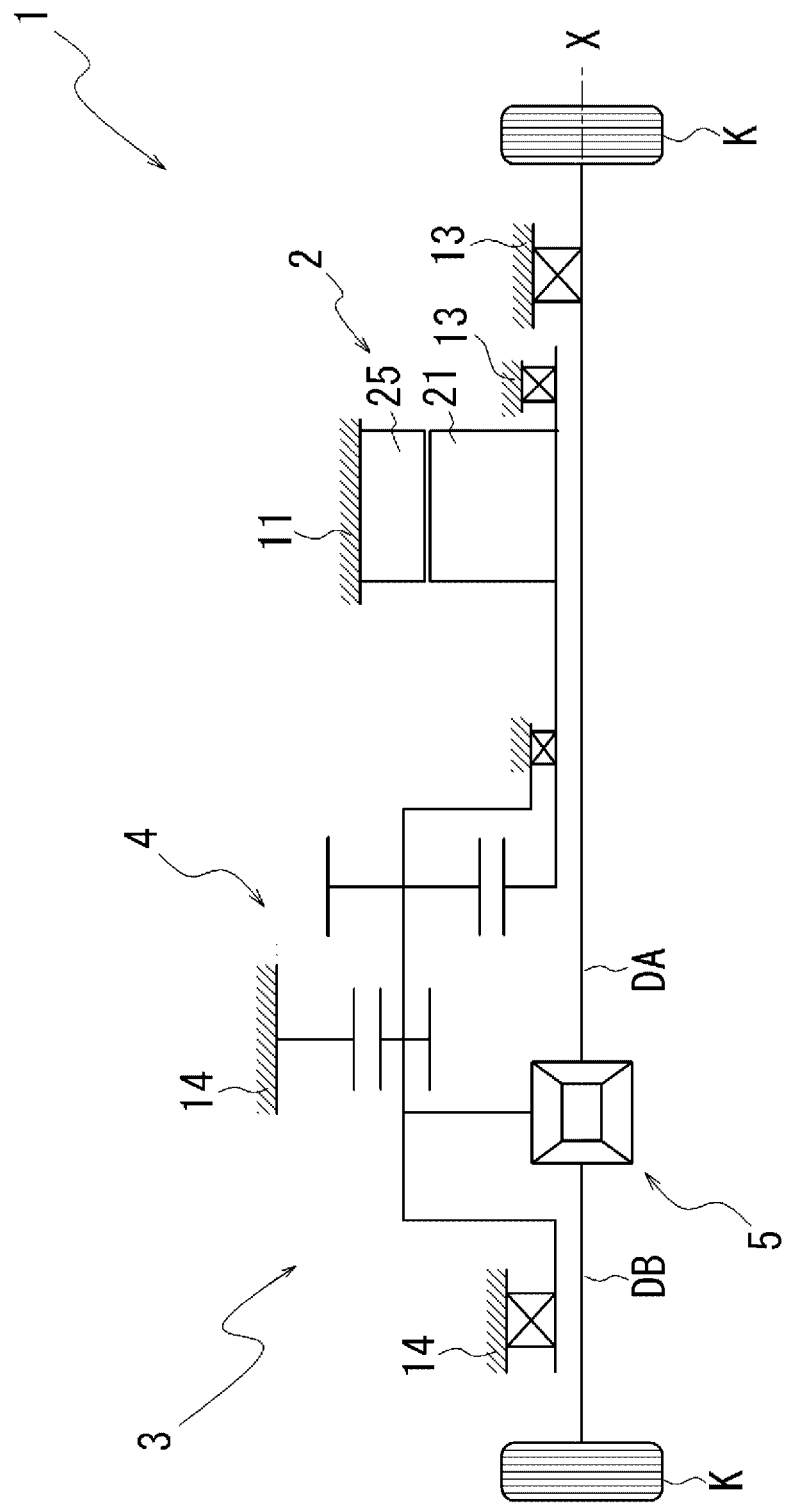
FIG. 1 is a skeleton diagram illustrating a unit mounted on a vehicle.

First, definitions of terms in the present specification will be described.

A "unit" is also referred to as a "motor unit", a "power transmission device", or the like. The motor unit is a unit that includes at least a motor. The power transmission device is a device that includes at least a power transmission mechanism, and is, for example, a gear mechanism and/or a differential gear mechanism. A unit that is a device including a motor and a power transmission mechanism belongs to the concept of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are disposed in a predetermined direction, in the description of the specification, it may be considered that there is a sentence explaining that the plurality of elements overlap when viewed in the predetermined direction.

The descriptions "do not overlap when viewed in a predetermined direction" and "are offset when viewed in a predetermined direction" mean that a plurality of elements are not disposed in a predetermined direction, and have the same meaning as the descriptions "do not overlap in a predetermined direction" and "are offset in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are not disposed in a predetermined direction, in the description of the specification, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing shows that the first element is positioned between the second element and the third element when viewed in a predetermined direction, in the description of the specification, it may be considered that there is a sentence explaining that the first element is between the second element and the third element when viewed in the predetermined direction.

In a case where two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. Examples of components include a motor, a gear mechanism, and a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. The integrated formation of the catch tank and the housing contributes to a reduction in the number of components.

A "coolant" is a refrigerant and is a type of heat exchange medium. For example, the "coolant" is a liquid (cooling water or the like) or a gas (air or the like). The coolant is a concept that includes oil, but when both oil and coolant are described in the present specification, it means that the coolant is made of a material different from that of the oil.

A "heat exchange unit" is an element (component, portion, or the like) that exchanges heat between two different heat exchange media (refrigerants). Combinations of the two heat exchange media are, for example, oil and cooling water, cooling water and air, or air and oil. The heat exchange unit includes, for example, a heat exchanger (oil cooler), a flow path through which a coolant flows, and a heat pipe. In the present invention, it is preferable to use a heat exchanger (oil cooler) as the heat exchange unit. The use of the heat exchanger can contribute to the improvement in the heat exchange efficiency.

The heat exchanger (oil cooler) is a separate component from the housing. In the heat exchanger, for example, heat is exchanged between oil and cooling water.

A "vehicle room" means a room in a vehicle into which passengers enter.

Hereinafter, an embodiment of the present invention will be described.

FIG. 1 is a skeleton diagram illustrating a unit mounted on a vehicle.

Figure 2:
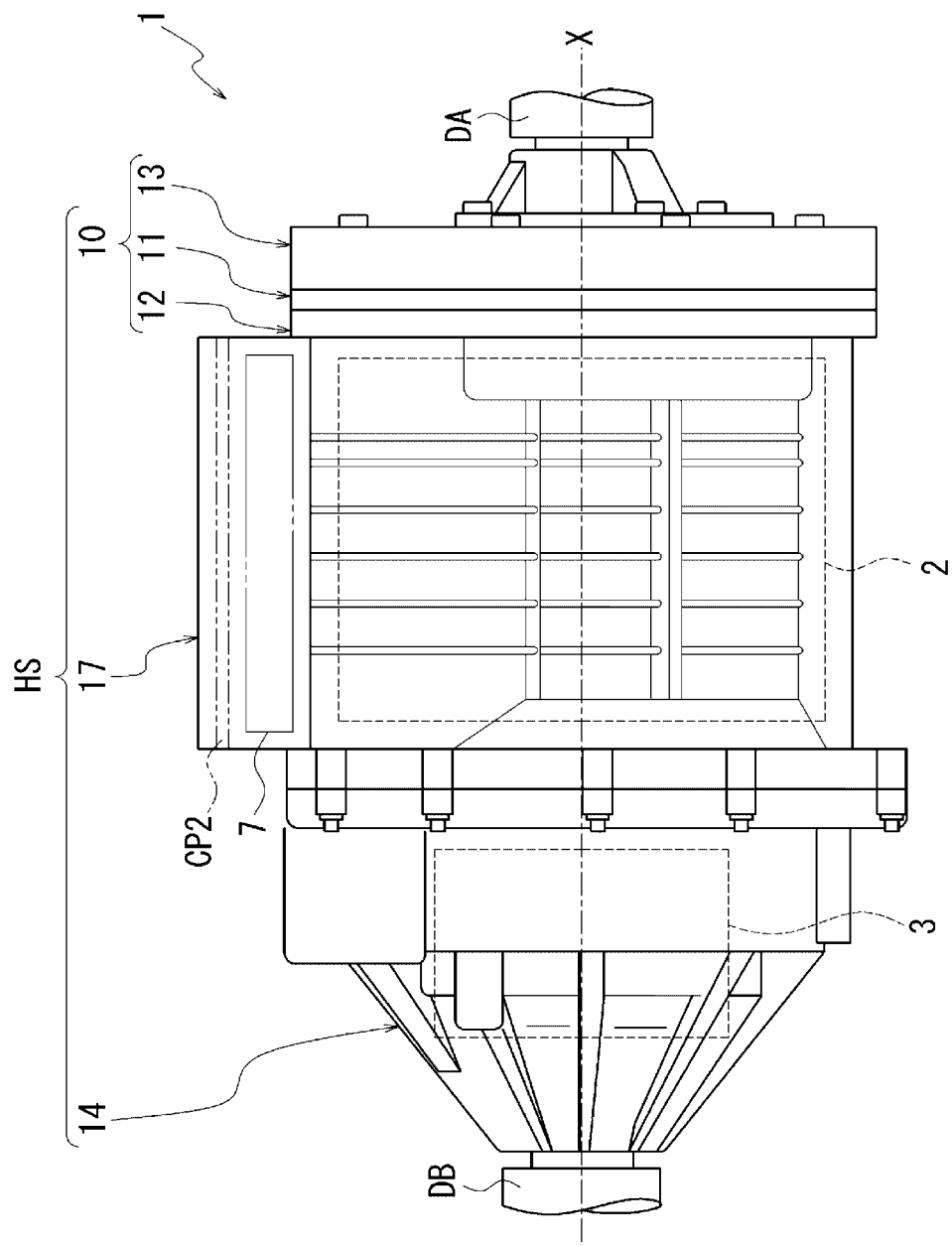
FIG. 2 is an external view of the unit.

FIG. 2 is an external view of the unit.

Figure 3:
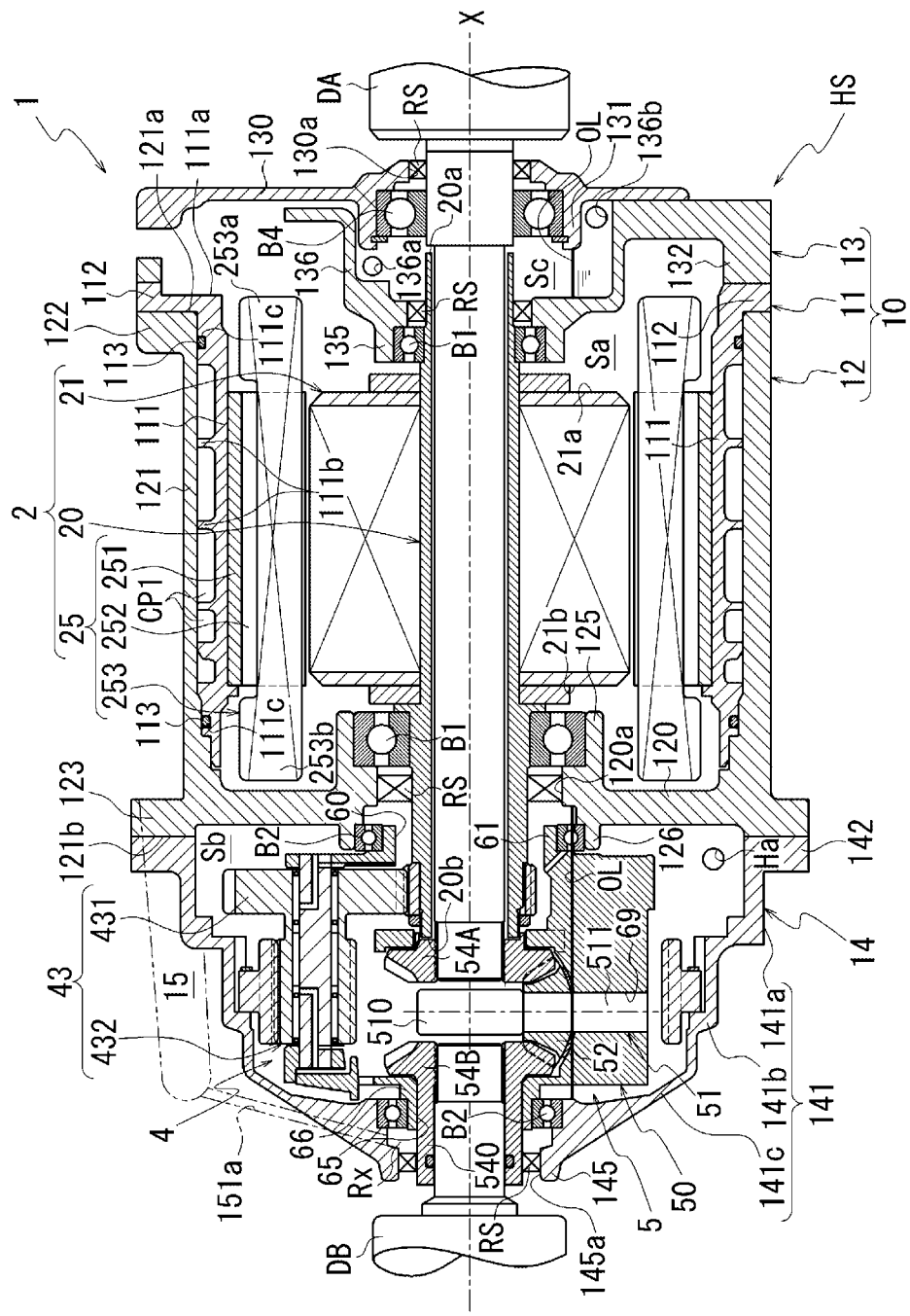
FIG. 3 is a schematic cross-sectional view of the unit.

FIG. 3 is a schematic cross-sectional view of the unit. FIG. 3 shows a state in which an inverter case is removed.

Figure 4:
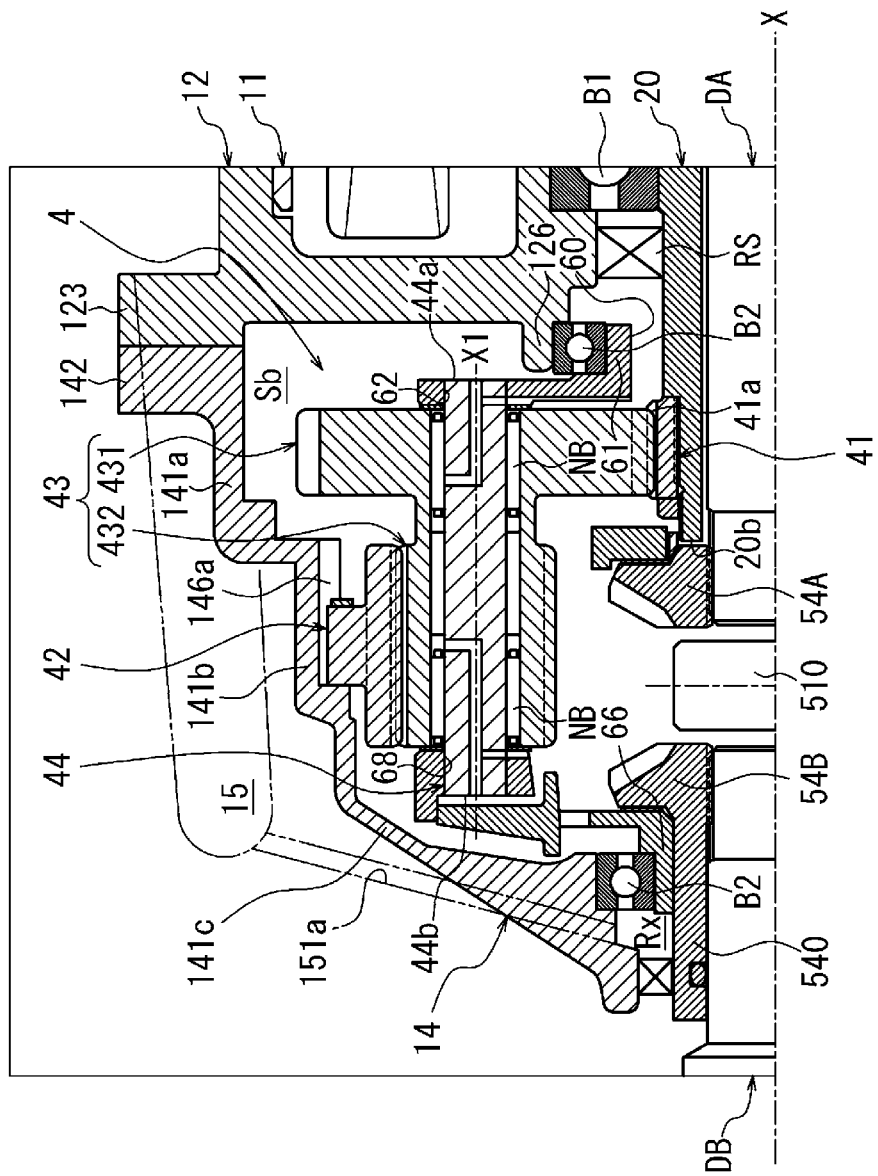
FIG. 4 is an enlarged view around a planetary reduction gear.

FIG. 4 is an enlarged view around a planetary reduction gear.

Figure 5:
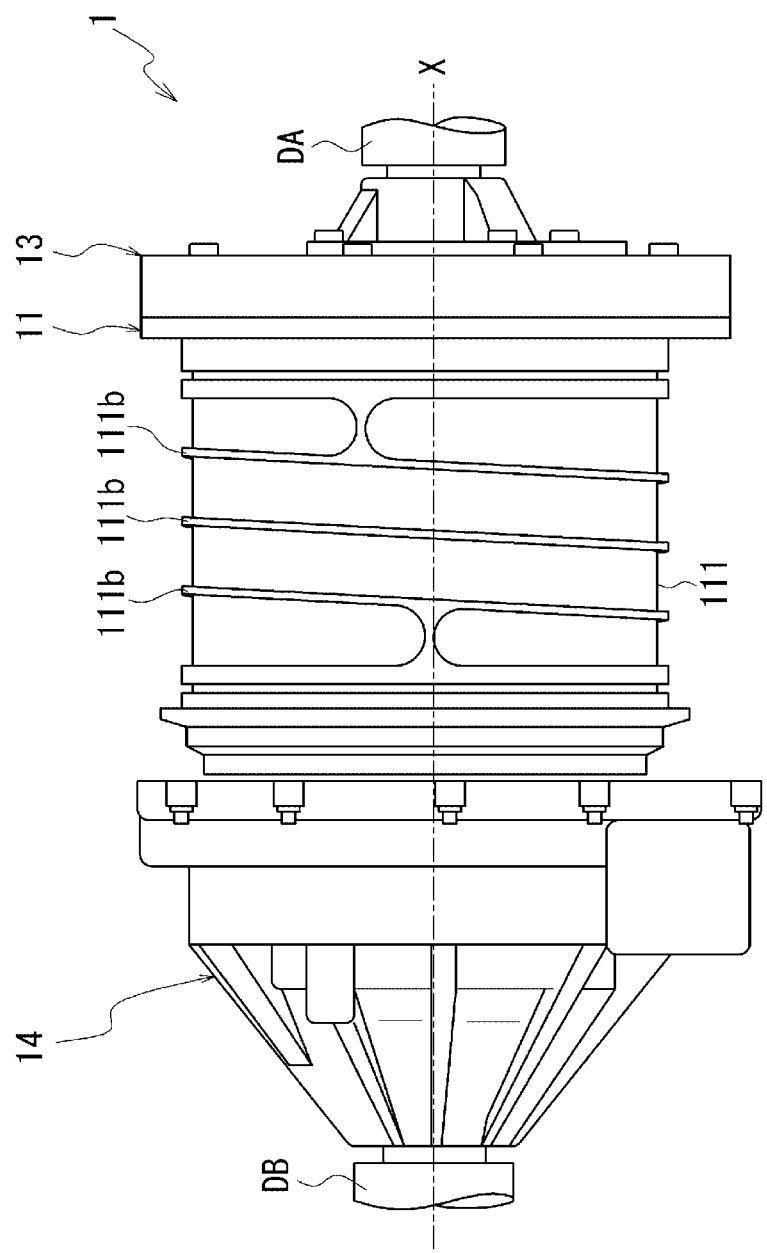
FIG. 5 is a top view of a motor case with a second case member removed.

FIG. 5 is a top view of a motor case with a second case member removed.

Figure 6:
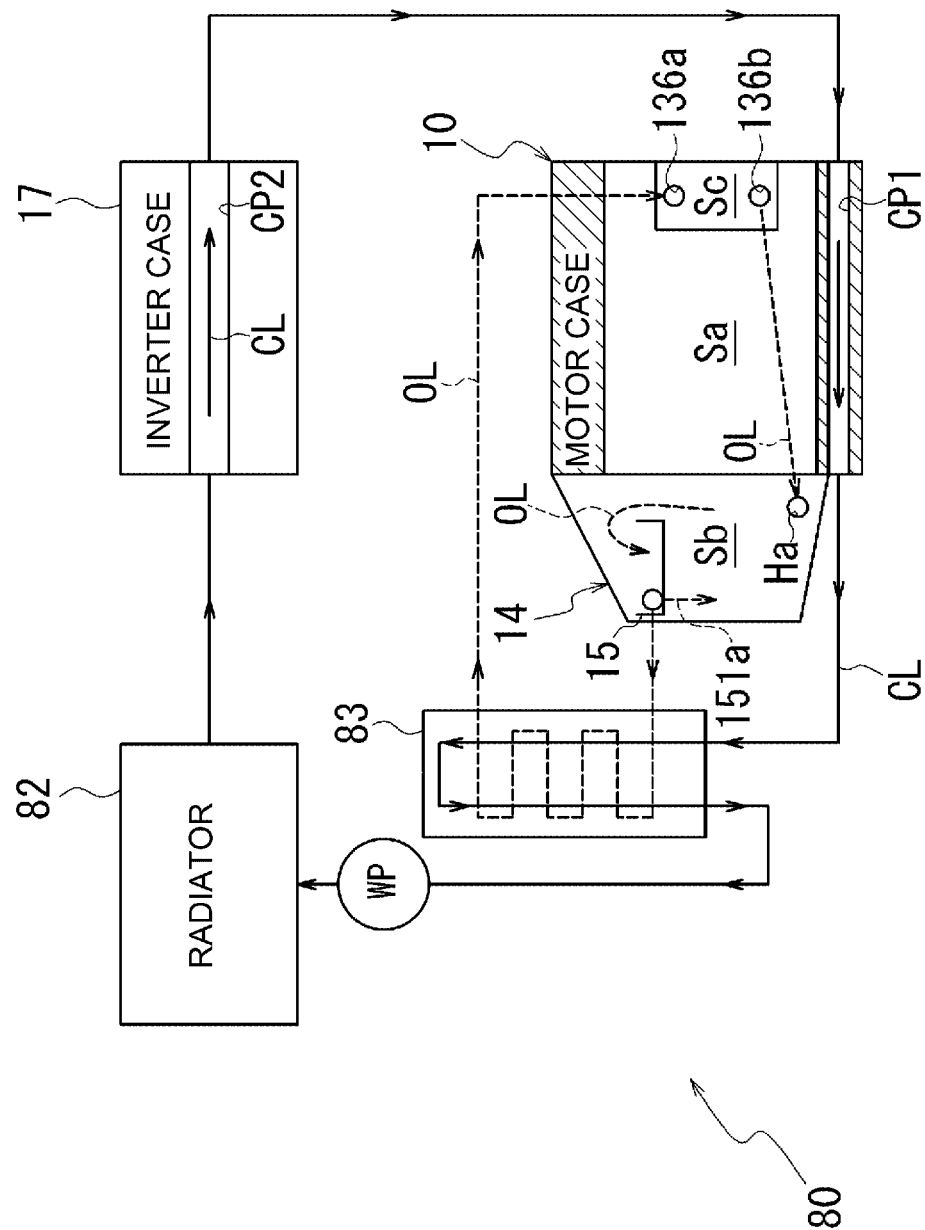
FIG. 6 is a diagram illustrating a flow of cooling water in the unit.

FIG. 6 is a diagram showing a circulation system of cooling water in the unit.

Figure 7:
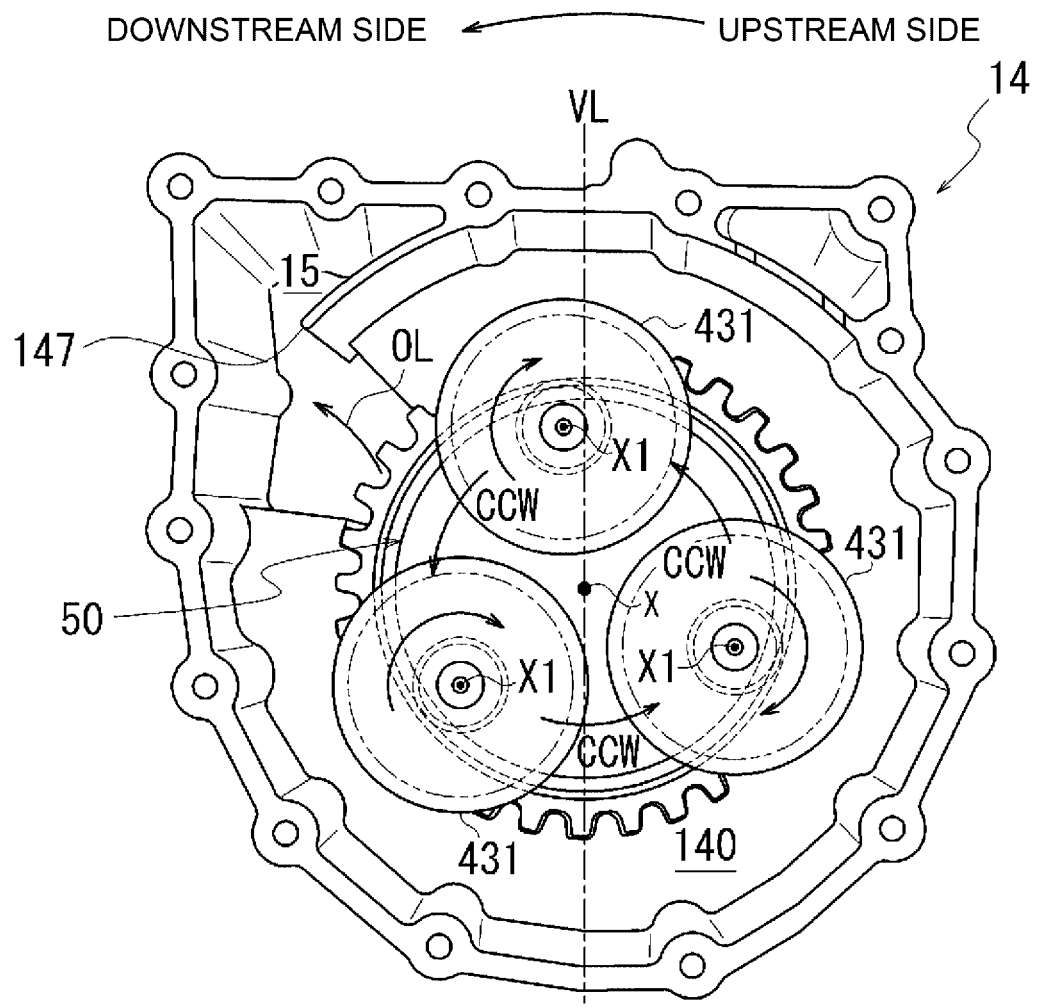
FIG. 7 is a diagram illustrating oil scraping up by a differential case.

FIG. 7 is a diagram illustrating a catch tank of a gear case.

As shown in FIG. 1, a unit 1 is a 3-in-1 unit, and includes a motor 2, a power transmission mechanism 3 that transmits the power output from the motor 2 to drive wheels K and K of a vehicle, and an inverter 7 (see FIG. 2) that is a power conversion device of the motor 2.

In the embodiment, as shown in FIG. 1, the unit 1 includes, as the power transmission mechanism 3, a planetary reduction gear 4 (reduction gear mechanism, planetary gear mechanism), a differential mechanism 5 (differential gear mechanism), and drive shafts DA and DB as output shafts. In the unit 1, the planetary reduction gear 4, the differential mechanism 5, and the drive shafts DA and DB are provided along a transmission path of output rotation about a rotation axis X of the motor 2. Axes of the drive shafts DA and DB are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K and K of the vehicle on which the unit 1 is mounted via the drive shafts DA and DB.

Here, the planetary reduction gear 4 is connected downstream of the motor 2. The differential mechanism 5 is connected downstream of the motor 2 via the planetary reduction gear 4. The drive shafts DA and DB are connected downstream of the differential mechanism 5.

As shown in FIG. 2, the unit 1 includes, as a 3-in-1 type housing, a housing HS that accommodates the motor 2, the power transmission mechanism 3 and the inverter 7. The housing HS includes one or more cases. The housing HS includes, for example, a motor case 10 that accommodates the motor 2, a gear case 14 that accommodates the power transmission mechanism 3, and an inverter case 17 that accommodates the inverter 7. The gear case 14 is joined to one end of the motor case 10 in a rotation axis X direction. The inverter case 17 is joined above the motor case 10 in a gravity direction when the unit 1 is mounted on the vehicle.

The inverter 7 is an electronic component including a smoothing capacitor, a power semi-conductor element, a driver board, and the like. The inverter 7 is electrically connected to the motor 2 inside the motor case 10 by wiring (not shown).

In the inverter case 17, a cooling path CP2 through which cooling water CL (see FIG. 6) for cooling the inverter 7 flows is formed.

The motor 2 has a portion that overlaps the differential mechanism 5 (differential gear mechanism) when viewed in an axial direction (see FIG. 3). Here, "when viewed in an axial direction" means when viewed from the rotation axis X direction. "When viewed in a radial direction" means when viewed from the radial direction of the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As shown in FIG. 3, the motor case 10 includes a first case member 11, a second case member 12 fitted onto the first case member 11, and a cover member 13 joined to one end of the first case member 11. The first case member 11 includes a cylindrical support wall portion 111 and a flange-shaped joint portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled by fitting the peripheral wall portion 121 of the second case member 12 onto the support wall portion 111 of the first case member 11.

The joint portion 122 at the one end 121a of the peripheral wall portion 121 comes into contact with the joint portion 112 of the first case member 11 from the rotation axis X direction. The joint portions 122 and 112 are connected with bolts (not shown).

As shown in FIG. 5, a protrusion 111b is provided on an outer periphery of the support wall portion 111 of the first case member 11. The protrusion 111b is a wall surrounding the rotation axis X at intervals. The protrusion 111b of the support wall portion 111 is provided in a spiral shape with a phase shifted from one end toward the other end in the rotation axis X direction. The protrusion 111b surrounds the outer periphery of the support wall portion 111 over the entire circumference of the support wall portion 111.

As shown in FIG. 3, the peripheral wall portion 121 of the second case member 12 is fitted onto the support wall portion 111 of the first case member 11. In this state, since an inner periphery of the peripheral wall portion 121 comes into contact with an outer periphery of the spiral protrusion 111b of the support wall portion 111, a space is formed between the peripheral wall portion 121 and the support wall portion 111. The space surrounds the rotation axis X with gaps therebetween and is continuously formed in a spiral shape in the rotation axis X direction. The spiral space forms a cooling path CP1 through which the cooling water CL (see FIG. 6), which is a coolant, flows. In FIG. 6, the spiral cooling path CP1 is simplified and shown as a straight line.

In the outer periphery of the support wall portion 111 of the first case member 11, ring grooves 111c and 111c are formed on both sides of the region where the protrusion 111b is provided. Seal rings 113 and 113 are fitted and attached to the ring grooves 111c and 111c.

The seal rings 113 are pressed against the inner periphery of the peripheral wall portion 121 fitted onto the support wall portion 111 to seal gaps between the outer periphery of the support wall portion 111 and the inner periphery of the peripheral wall portion 121.

A wall portion 120 (cover) extending radially inward is provided at the other end 121b of the second case member 12. The wall portion 120 is provided in a direction orthogonal to the rotation axis X. An opening 120a through which the drive shaft DA is inserted is provided in a region of the wall portion 120 intersecting the rotation axis X.

A tubular motor support portion 125 that surrounds the opening 120a and extends toward the motor 2 is provided on a surface of the wall portion 120 closer to the motor 2 (right side in the drawing).

The motor support portion 125 is inserted inside a coil end 253b, which will be described later. The motor support portion 125 faces an end portion 21b of a rotor core 21 with a gap therebetween in the rotation axis X direction. Bearings B1 are supported on an inner periphery of the motor support portion 125. An outer periphery of a motor shaft 20 is supported by the motor support portion 125 via the bearings B1.

A tubular wall portion 126 extending toward the differential mechanism 5 is provided on a surface of the wall portion 120 closer to the differential mechanism 5 (left side in the drawing). The tubular wall portion 126 has a cylindrical shape surrounding the opening 120a, and an inner periphery of the tubular wall portion 126 supports bearings B2. The bearings B2 support a tubular wall portion 61 of a differential case 50, which will be described later.

The cover member 13 includes a wall portion 130 orthogonal to the rotation axis X and a joint portion 132.

When viewed from the first case member 11, the cover member 13 is positioned on an opposite side (right side in the drawing) to the differential mechanism 5. The joint portion 132 of the cover member 13 is joined to the joint portion 112 of the first case member 11 from the rotation axis X direction. The cover member 13 and the first case member 11 are connected to each other with bolts (not shown). In this state, in the first case member 11, an opening of the support wall portion 111 closer to the joint portion 122 (right side in the drawing) is closed by the cover member 13.

In the cover member 13, an insertion hole 130a for the drive shaft DA is provided in a central portion of the wall portion 130.

Lip seals RS are provided on an inner periphery of the insertion hole 130a. The lip seals RS bring a lip portion (not shown) into elastic contact with an outer periphery of the drive shaft DA. A gap between the inner periphery of the insertion hole 130a and the outer periphery of the drive shaft DA is sealed by the lip seals RS.

A peripheral wall portion 131 surrounding the insertion hole 130a is provided on a surface of the wall portion 130 closer to the first case member 11 (left side in the drawing). The drive shaft DA is supported on an inner periphery of the peripheral wall portion 131 via bearings B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 closer to the wall portion 130 (right side in the drawing). The connection wall 136 is provided along the rotation axis X and extends away from the motor 2. The connection wall 136 connects the motor support portion 135 and the joint portion 132.

One end 20a of the motor shaft 20 penetrates the inside of the motor support portion 135 from the motor 2 to the peripheral wall portion 131. Bearings B1 are supported on an inner periphery of the motor support portion 135. The outer periphery of the motor shaft 20 is supported by the motor support portion 135 via the bearings B1.

A lip seal RS is provided at a position adjacent to the bearing B1.

Oil holes 136a and 136b are opened in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

The gear case 14 includes a peripheral wall portion 141 and a flange-shaped joint portion 142 provided at an end portion of the peripheral wall portion 141 closer to the motor case 10. A support portion 145 for bearings B2, which will be described later, is provided at an end portion of the peripheral wall portion 141 on a side (left side in the drawing) opposite to the joint portion 142. The peripheral wall portion 141 includes a tubular wall portion 141a connected to the joint portion 142, an inclined portion 141c (inclined surface) connected to the support portion 145, and a connection wall portion 141b connecting the tubular wall portion 141a and the inclined portion 141c. The tubular wall portion 141a and the connection wall portion 141b are gradually reduced in diameter from the joint portion 142 and connected to the inclined portion 141c. The inclined portion 141c is inclined radially inward from the connection wall portion 141b toward the support portion 145. The planetary reduction gear 4 and the differential mechanism 5 as the power transmission mechanism 3 are accommodated inside the peripheral wall portion 141.

The gear case 14 is positioned closer to the differential mechanism 5 (left side in the drawing) when viewed from the motor case 10. The joint portion 142 of the gear case 14 is joined to the joint portion 123 of the second case member 12 of the motor case 10 from the rotation axis X direction. The gear case 14 and the second case member 12 are connected to each other with bolts (not shown).

A space formed inside the joined motor case 10 and gear case 14 is divided into two spaces by the wall portion 120 (cover) of the second case member 12. The motor case 10 side of the wall portion 120 is a motor chamber Sa that accommodates the motor 2, and the gear case 14 side is a gear chamber Sb that accommodates the power transmission mechanism 3. The wall portion 120 as a cover is sandwiched between the motor 2 and the differential mechanism 5 inside the housing HS.

The cover may have a portion accommodated in the housing HS, or the entire cover may be accommodated in the housing HS like the wall portion 120. The cover may be, for example, separate from the second case member 12. In this case, the cover may be sandwiched and fixed between the motor case 10 and the gear case 14. A part of the cover may be exposed outside of the housing HS.

The motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearings B1 positioned on the one end 20a (right side in the drawing) of the motor shaft 20 when viewed from the rotor core 21 are supported on the inner periphery of the motor support portion 135 of the cover member 13. The bearings B1 positioned on the other end 20b (left side in the drawing) are supported on the inner periphery of the cylindrical motor support portion 125 of the second case member 12.

The motor support portion 135 is disposed facing one end portion 21a of the rotor core 21 with a gap therebetween in the rotation axis X direction on an inner diameter side of a coil end 253a, which will be described later, and the motor support portion 125 is disposed facing the other end portion 21b of the rotor core 21 with a gap therebetween in the rotation axis X direction on an inner diameter side of a coil end 253b, which will be described later.

The rotor core 21 is formed by laminating a plurality of silicon steel plates. The silicon steel plates are fitted onto the motor shaft 20 such that relative rotation with respect to the motor shaft 20 is restricted.

When viewed from the rotation axis X direction of the motor shaft 20, the silicon steel plate has a ring shape. On an outer peripheral side of the silicon steel plate, N-pole and S-pole magnets (not shown) are alternately provided in a circumferential direction around the rotation axis X.

The stator core 25 surrounding the outer periphery of the rotor core 21 is formed by laminating a plurality of electromagnetic steel plates. The stator core 25 is fixed to the inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around the plurality of teeth portions 252 in a distributed manner is adopted. The stator core 25 is longer than the rotor core 21 in the rotation axis X direction by lengths of the coil ends 253a and 253b protruding in the rotation axis X direction.

A stator core in which windings are concentratedly wound around each of the plurality of teeth portions 252 protruding toward the rotor core 21 may be adopted.

The opening 120a is provided in the wall portion 120 (motor support portion 125) of the second case member 12. The other end 20b of the motor shaft 20 penetrates through the opening 120a to the differential mechanism 5 (left side in the drawing) and is positioned in the gear case 14.

The other end 20b of the motor shaft 20 faces a side gear 54A, which will be described later, inside the gear case 14 with a gap therebetween in the rotation axis X direction.

The lip seals RS are inserted between the motor shaft 20 and the opening 120a of the wall portion 120.

The oil OL for lubricating the planetary reduction gear 4 and the differential mechanism 5 are sealed on an inner diameter side of the gear case 14.

The lip seals RS are provided to prevent the oil OL in the gear case 14 from flowing into the motor case 10.

As shown in FIG. 4, a sun gear 41 of the planetary reduction gear 4 is spline-fitted in a region of the motor shaft 20 positioned in the gear case 14.

A teeth portion 41a is formed on an outer periphery of the sun gear 41, and a large-diameter gear portion 431 of a stepped pinion gear 43 meshes with the teeth portion 41a.

The stepped pinion gear 43 includes the large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

An outer periphery of the small-diameter gear portion 432 meshes with an inner periphery of a ring gear 42. The ring gear 42 has a ring shape surrounding the rotation axis X with a gap therebetween. On an outer periphery of the ring gear 42, engagement teeth are provided, and the engagement teeth are spline-fitted to a teeth portion 146a provided on an inner periphery of the connection wall portion 141b. The ring gear 42 is restricted from rotating about the rotation axis X.

A pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB, NB.

As shown in FIG. 3, the differential mechanism 5 includes the differential case 50 as an input element, the drive shafts DA and DB (output shafts) as output elements, and a differential gear set as a differential element. Although detailed description is omitted, the differential case 50 may be configured by two case members assembled in a rotation axis direction.

The differential case 50 also functions as a carrier that supports the stepped pinion gear 43 of the planetary reduction gear 4. The stepped pinion gear 43 is rotatably supported by the differential case 50 via the pinion shaft 44. As shown in FIG. 7, three stepped pinion gears 43 are disposed at intervals in the circumferential direction around the rotation axis X.

As shown in FIG. 3, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and shaft members 511 connected to an outer diameter side of the central member 510. Although not shown, the plurality of shaft members 511 are provided at equal intervals in the circumferential direction around the rotation axis X. The shaft members 511 are inserted through a support hole 69 extending in a radial direction of the differential case 50 and supported.

The pinion mate gear 52 is fitted onto the shaft members 511 and is rotatably supported.

In the differential case 50, the side gear 54A is positioned on one side of the central member 510 in the rotation axis X direction, and the side gear 54B is positioned on the other side of the central member 510. The side gears 54A and 54B are rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and a tubular wall portion 61 surrounding the opening 60 and extending toward the motor case 10 are provided in a central portion of one end (right side in the drawing) of the differential case 50. An outer periphery of the tubular wall portion 61 is supported by the wall portion 120 of the second case member 12 via the bearings B2.

The drive shaft DA inserted through the opening 60 is inserted into the differential case 50 from the rotation axis X direction. The drive shaft DA penetrates the insertion hole 130a of the wall portion 130 of the cover member 13, and is provided across inner diameter sides of the motor shaft 20 of the motor 2 and the sun gear 41 of the planetary reduction gear 4 in the rotation axis X direction.

As shown in FIG. 3, a through hole 65 and a tubular wall portion 66 surrounding the through hole 65 are formed in a central portion on the other end side (left side in the drawing) of the differential case 50. The bearings B2 are fitted onto the tubular wall portion 66. The bearings B2 fitted onto the tubular wall portion 66 are held by the support portion 145 of the gear case 14. The tubular wall portion 66 of the differential case 50 is rotatably supported by the gear case 14 via the bearings B2.

The drive shaft DB penetrating an opening 145a of the gear case 14 is inserted into the support portion 145 from the rotation axis X direction. The drive shaft DB is rotatably supported by the support portion 145. The tubular wall portion 66 functions as a shaft support portion that supports the outer periphery of the drive shaft DB.

The lip seals RS are fixed to an inner periphery of the opening 145a. Lip portions (not shown) of the lip seals RS are in elastic contact with an outer periphery of the tubular wall portion 540 of the side gear 54B that is fitted onto the drive shaft DB.

Thus, a gap between the outer periphery of the tubular wall portion 540 of the side gear 54B and the inner periphery of the opening 145a is sealed.

Inside the differential case 50, distal end portions of the drive shafts DA and DB face each other with a gap therebetween in the rotation axis X direction.

The side gears 54A and 54B supported by the differential case 50 are spline-fitted to outer peripheries of the distal end portions of the drive shafts DA and DB. The side gears 54A and 54B and the drive shafts DA and DB are coupled to each other so as to be integrally rotatable about the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 is assembled to the side gear 54A positioned on one side in the rotation axis X direction and the side gear 54B positioned on the other side in the rotation axis X direction such that teeth portions of the side gear 54A and the side gear 54B mesh with each other.

As shown in FIG. 4, a support hole 62 at one end 44a of the pinion shaft 44 is formed an outer diameter side of the opening 60 at the one end (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X in accordance with the position where the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported about the axis X1 parallel to the rotation axis X.

Although not shown, the oil OL for lubrication is stored inside the gear case 14. When the differential case 50 rotates about the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. As a result, the oil OL is easily introduced into rotating members such as the bearing B2 and the needle bearing NB.

As shown in FIG. 7, a catch tank 15 is provided above the differential case 50 inside the gear case 14. The catch tank 15 is positioned on one side (left side in the drawing) of a vertical line VL orthogonal to the rotation axis X. The catch tank 15 and an accommodation portion 140 of the differential case 50 communicate with each other via a communication port 147. Part of the oil OL scraped up by the differential case 50 and scattered flows into the catch tank 15 from the communication port 147 and is collected.

When the vehicle equipped with the unit 1 travels forward, the differential case 50 rotates in a counterclockwise direction CCW about the rotation axis X when viewed from the motor case 10. As shown in FIG. 4, the small-diameter gear portion 432 of the stepped pinion gear 43 meshes with the ring gear 42 fixed to an inner periphery of the gear case 14. Therefore, as shown in FIG. 7, the large-diameter gear portion 431 of the stepped pinion gear 43 revolves about the rotation axis X in the counterclockwise direction CCW while rotating clockwise about the axis X1.

The catch tank 15 is positioned on the left side of the vertical line VL, that is, on a downstream side in a rotation direction of the differential case 50. As a result, most of the oil OL scraped up by the differential case 50 rotating about the rotation axis X can flow into the catch tank 15.

As shown in FIG. 3, the catch tank 15 is connected to a space Rx between the lip seal RS and the bearing B2 via an oil passage 151a. The catch tank 15 is connected to an oil cooler 83 (see FIG. 6) via an oil passage, a pipe, or the like (not shown). The oil cooler 83 is connected to the oil hole 136a (see FIG. 3) formed in the connection wall 136 via a pipe, an oil passage, or the like (not shown).

An oil hole Ha is formed in the peripheral wall portion 141 of the gear case 14. The oil hole Ha is connected to the oil hole 136b formed in the internal space Sc via a pipe (not shown). The oil OL discharged from the internal space Sc through the oil hole 136b is supplied again into the gear chamber Sb through the oil hole Ha.

As shown in FIG. 6, the unit 1 is provided with a circulation system 80 for the cooling water CL. The circulation system 80 circulates the cooling water CL between the cooling path CP1 of the motor case 10 and the cooling path CP2 of the inverter case 17. The circulation system 80 further includes the oil cooler 83, a water pump WP, and a radiator 82 between the cooling path CP1 and the cooling path CP2, which are connected by pipes or the like through which the cooling water CL flows.

The water pump WP feeds the cooling water CL through the circulation system 80.

The radiator 82 is a device that dissipates the heat of the cooling water CL to cool the cooling water CL.

The oil cooler 83 is a heat exchanger that exchanges heat between the cooling water CL and the oil OL. The oil OL collected by the catch tank 15 provided in the gear chamber Sb of the gear case 14 is introduced into the oil cooler 83. The oil OL is cooled by heat exchange with the cooling water CL. The cooled oil OL is supplied from the oil hole 136a of the motor case 10 to the internal space Sc. The oil OL supplied to the oil cooler 83 is not limited to the oil OL collected by the catch tank 15, and may be supplied from another oil passage appropriately provided in the housing HS. The oil OL discharged from the oil cooler 83 may be supplied to a location other than the internal space Sc.

The cooling water CL is supplied to the oil cooler 83 after flowing through the cooling path CP2 in the inverter case 17 and the cooling path CP1 in the motor case 10. After the heat exchange with the oil OL in the oil cooler 83, the cooling water CL is cooled by the radiator 82 and supplied to the cooling path CP2 of the inverter case 17 again.

The operation of the unit 1 having such a configuration will be described.

As shown in FIG. 1, in the unit 1, the planetary reduction gear 4, the differential mechanism 5, and the drive shafts DA and DB are provided along a transmission path of output rotation of the motor 2.

As shown in FIG. 3, when the motor 2 is driven and the rotor core 21 rotates about the rotation axis X, the rotation is input to the sun gear 41 of the planetary reduction gear 4 via the motor shaft 20 that rotates integrally with the rotor core 21.

In the planetary reduction gear 4, the sun gear 41 serves as an input portion for the output rotation of the motor 2, and the differential case 50 supporting the stepped pinion gear 43 serves as an output portion for the input rotation.

As shown in FIG. 4, when the sun gear 41 rotates about the rotation axis X by the input rotation, the stepped pinion gear 43 (large-diameter gear portion 431 and small-diameter gear portion 432) rotates about the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating about the axis X1.

Here, in the stepped pinion gear 43, an outer diameter of the small-diameter gear portion 432 is smaller than an outer diameter of the large-diameter gear portion 431.

As a result, the differential case 50 supporting the stepped pinion gear 43 rotates about the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As shown in FIG. 3, when the differential case 50 rotates about the rotation axis X by the input rotation, the drive shafts DA and DB meshing with the pinion mate gear 52 rotate about the rotation axis X in the differential case 50. As a result, the left and right drive wheels K and K (see FIG. 1) of the vehicle equipped with the unit 1 are rotated by the transmitted rotational driving force.

As shown in FIG. 3, the oil OL for lubrication and cooling is stored in the gear chamber Sb. In the gear chamber Sb, when the output rotation of the motor 2 is transmitted, the stored oil OL is scraped up by the differential case 50 rotating about the rotation axis X.

As shown in FIGS. 3 and 4, the scraped-up oil OL lubricates a meshing portion between the sun gear 41 and the large-diameter gear portion 431, a meshing portion between the small-diameter gear portion 432 and the ring gear 42, and meshing portions between the pinion mate gear 52 and the side gears 54A and 54B. The heat exchange with the oil OL cools these meshing portions.

As shown in FIG. 7, the differential case 50 rotates in the counterclockwise direction CCW about the rotation axis X.

The catch tank 15 is provided on an upper portion of the gear case 14. The catch tank 15 is positioned on the downstream side in the rotation direction of the differential case 50, and part of the oil OL scraped up by the differential case 50 flows into the catch tank 15.

As shown in FIG. 3, part of the oil OL flowing into the catch tank 15 is supplied to the space Rx between the lip seal RS and the bearing B2 via the oil passage 151a to lubricate the bearing B2. Part of the oil OL flowing into the catch tank 15 is introduced into an oil cooler 83 (see FIG. 6) via a pipe (not shown) and cooled. The cooled oil OL is supplied to the internal space Sc (see FIG. 3) formed in the connection wall 136 through the oil hole 136a. The oil OL supplied to the internal space Sc lubricates the bearing B4 and is discharged from the oil hole 136b. The oil OL discharged from the oil hole 136b is supplied into the gear chamber Sb from the oil hole Ha via a pipe or the like (not shown).

Figure 8:
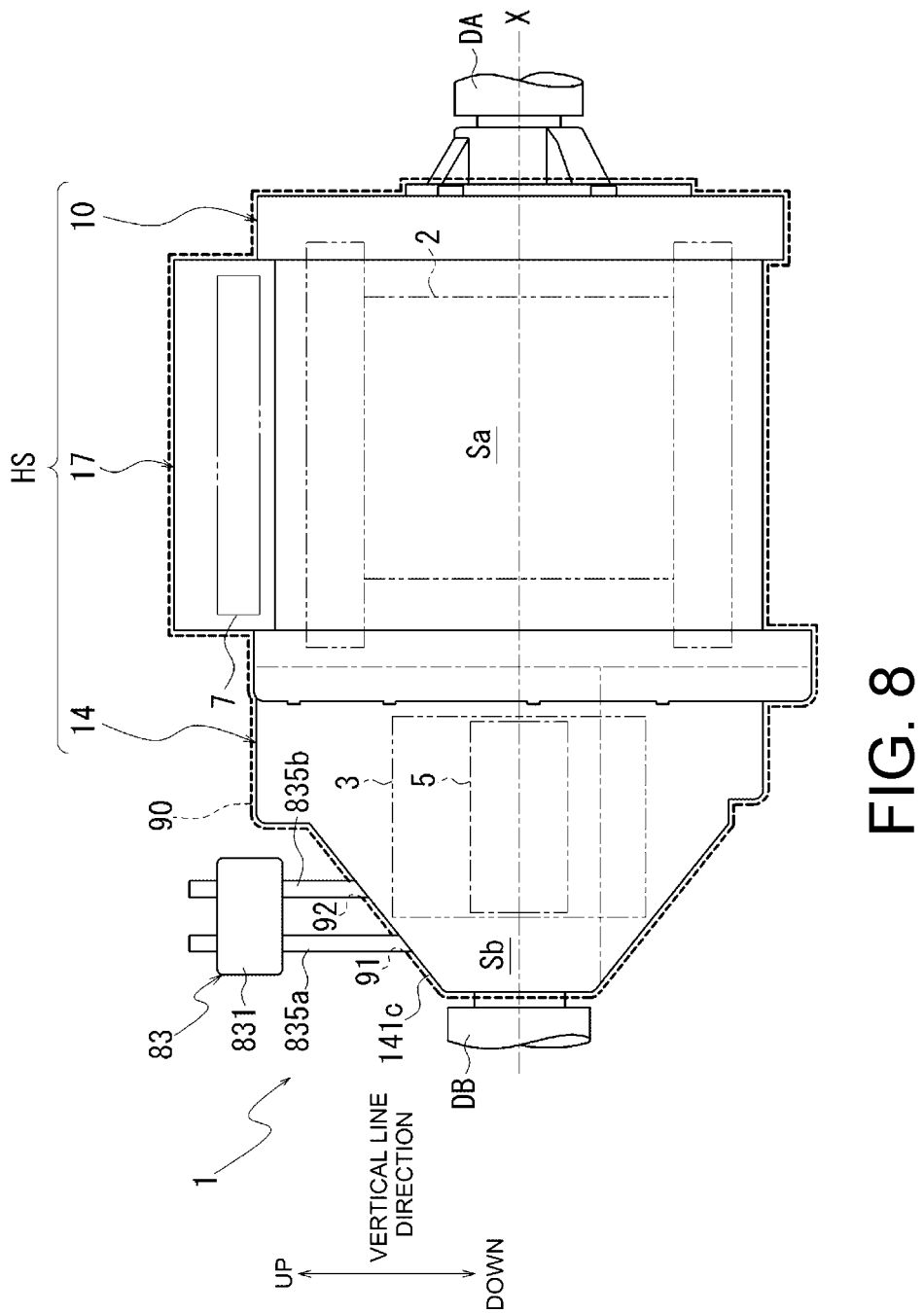
FIG. 8 is a diagram showing a covering that covers a housing.

FIG. 8 is a diagram showing a covering 90 that covers the housing HS.

Figure 9:
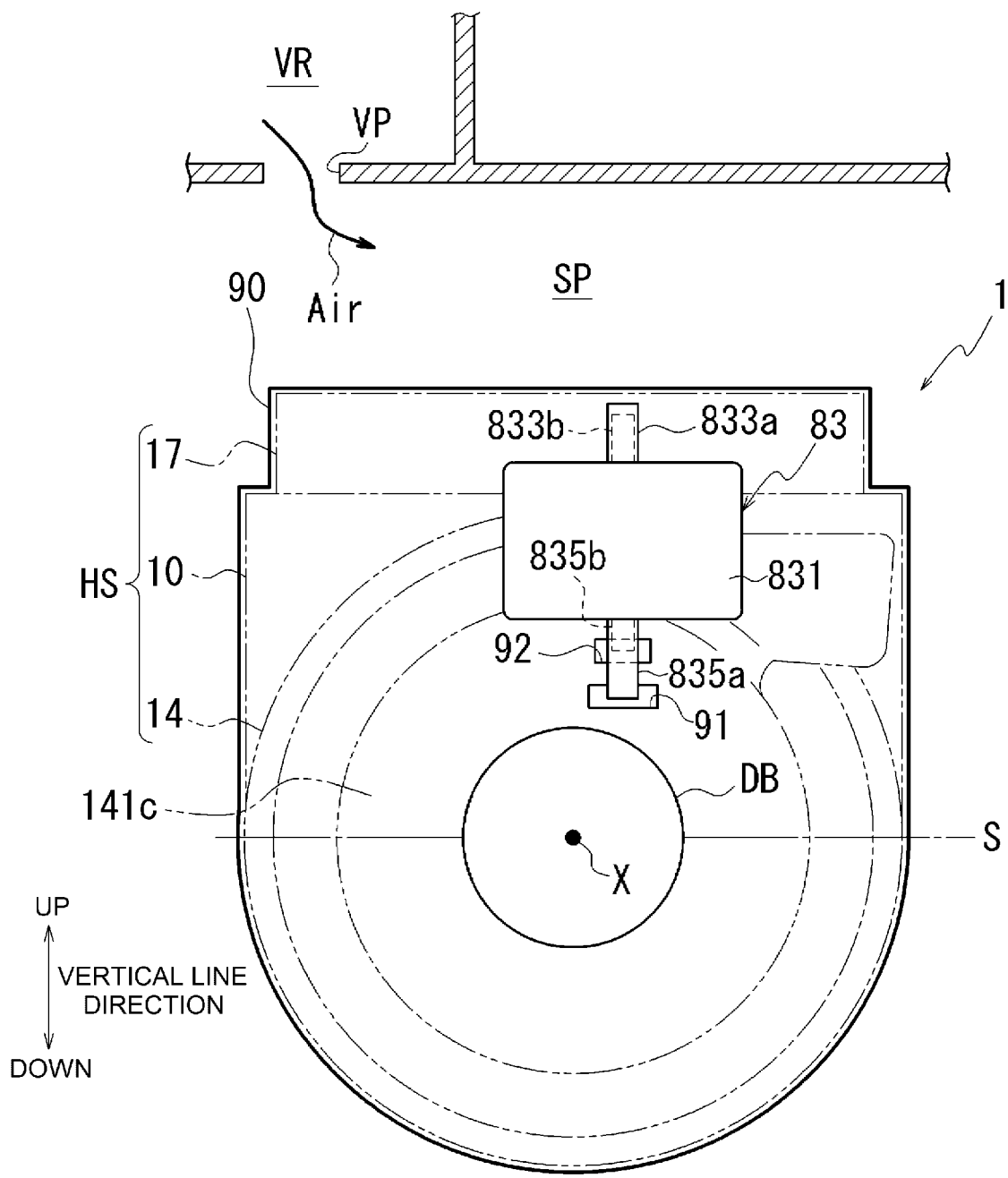
FIG. 9 is a diagram of FIG. 8 when viewed from a rotation axis direction.

FIG. 9 is a diagram of FIG. 8 when viewed from the rotation axis X direction.

Figure 10:
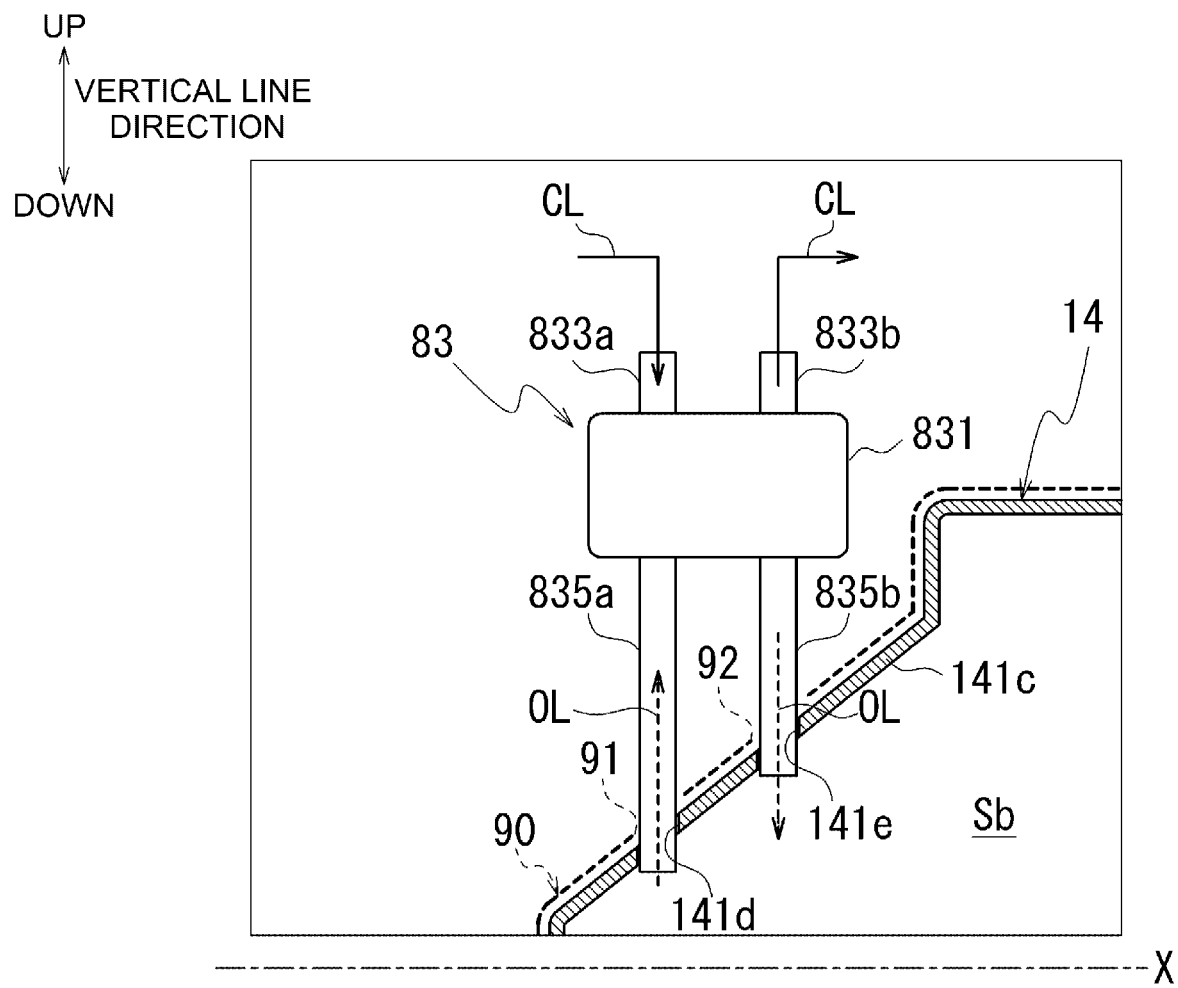
FIG. 10 is an enlarged view around an oil cooler.

FIG. 10 is an enlarged view around the oil cooler 83.

Figure 11:
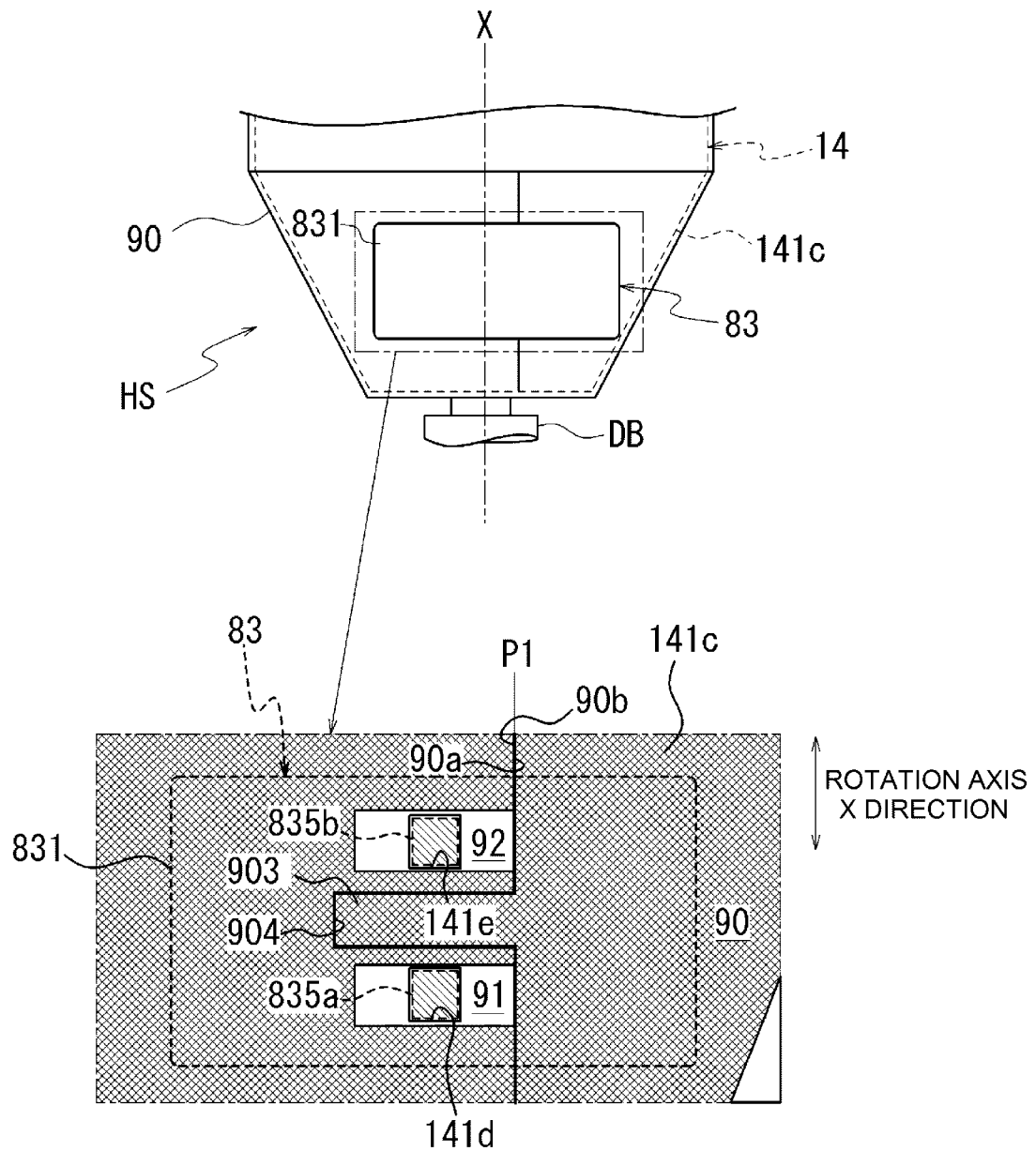
FIG. 11 is a diagram showing an inclined portion viewed from a radial direction of a rotation axis.

FIG. 11 is a diagram showing the inclined portion 141c viewed from the radial direction of the rotation axis X.

In FIGS. 8 to 11, the shape of the housing HS is simplified.

In FIG. 11, an enlarged view of a region enclosed by a two-dot chain line is shown in the lower part. In the enlarged view, to facilitate understanding of a positional relation between the oil cooler 83 and the covering 90, a region of the inclined portion 141c covered by the covering 90 is indicated by cross-hatching. Only outlines of respective portions of the oil cooler 83 are indicated by broken lines, and an introduction portion 835a and a discharge portion 835b are indicated by hatching.

As shown in FIG. 8, as a noise countermeasure, the housing HS of the unit 1 can be covered with the covering 90 which is a separate component. The noise countermeasure means, for example, a countermeasure for reducing noise that is generated in various components (for example, power transmission mechanism 3 and motor 2) of the unit 1 and leaks to the outside. The noise is sound or electromagnetic noise.

The covering 90 can be made of a material having a noise reduction function (for example, soundproof function, sound absorption function, and sound insulation function). The material applicable to the covering 90 includes, for example, organic materials and metal materials. A material containing an organic material is preferable to enhance a sound reduction effect. A material containing a metal material is preferable to enhance an effect of reducing the electromagnetic noise.

Among the organic materials, for example, urethane, rubber, and polyethylene have a good sound reduction effect and are particularly preferred materials.

Among the metal materials, particularly preferred materials are materials having higher specific conductivity/specific permeability and/or materials having higher specific conductivity×specific permeability than a material of the housing HS as the materials further enhance the effect of reducing the electromagnetic noise. For example, when the material of the housing HS is a material containing aluminum as a main component, the metal material applied to the covering 90 is preferably a material containing gold, silver, and copper.

The covering 90 may be formed by laminating different materials and/or mixing different materials. For example, when the covering 90 is formed by laminating a metal material and an organic material, or when the covering 90 is made of a material in which particles (metal particles, alloy particles, or the like) containing a metal are mixed with an organic material, it is preferable as a countermeasure against sound and electromagnetic noise.

To enhance an effect of reducing sound leakage, the covering 90 may have a porous structure.

In covering the housing HS with the covering 90, a material having a waterproof effect can be used to improve the durability. The metal material has a waterproof effect. Examples of organic materials having a waterproof effect include rubber and polyethylene.

In FIG. 8, the covering 90 is indicated by a broken line. The covering 90 is disposed along an outer surface of the housing HS. The covering 90 can be formed by, for example, winding a sheet made of a material that is flexible enough to fit the outer surface of the housing HS around the outer surface of the housing HS.

The covering 90 covering the entire housing HS overlaps the power transmission mechanism 3 and the motor 2 when viewed in the rotation axis X direction and the radial direction of the rotation axis X. This contributes to the noise countermeasure of the housing HS.

The covering 90 is not limited to covering the entire housing HS, and may cover only the gear case 14 or the motor case 10, for example. Alternatively, the covering 90 may cover the gear case 14 and the motor case 10 and expose the inverter case 17 from the covering 90.

Heat is likely to be generated in the housing HS due to the rotation of the components constituting the motor 2 and the power transmission mechanism 3. Since the housing HS is covered with the covering 90, heat is likely to accumulate therein. Therefore, it is desirable to implement a heat countermeasure for the housing HS.

In the embodiment, as the heat countermeasure, the unit 1 is provided with the oil cooler 83 as a heat exchange unit. As described above, the oil cooler 83 is a heat exchanger that cools the oil OL by heat exchange with the cooling water CL (see FIG. 6). The oil cooler 83 cools the oil OL stored in the housing HS. As a result, the efficiency of heat exchange between the oil OL and the components constituting the motor 2 and the power transmission mechanism 3 is improved, and the temperature rise of the housing HS is reduced.

As shown in FIG. 8, the oil cooler 83 is disposed above the inclined portion 141c of the gear case 14. The inclined portion 141c has a truncated cone shape that decreases in diameter from the motor case 10 toward the drive shaft DB. A space around the inclined portion 141c is larger than a space around the motor case 10 and the like of the unit 1. In the embodiment, the oil cooler 83 is disposed in the space around the inclined portion 141c.

The oil cooler 83 is provided to be exposed from the covering 90 covering the housing HS.

As shown in FIG. 9, the oil cooler 83 includes a main body portion 831. Although not shown, a flow path for the cooling water CL and a flow path for the oil OL are provided inside the main body portion 831, and heat is exchanged between the cooling water CL and the oil OL. As shown in FIG. 10, the main body portion 831 is provided apart from a wall surface of the inclined portion 141c.

An introduction portion 833a and a discharge portion 833b for the cooling water CL are provided above the main body portion 831 in a vertical line direction (gravity direction). The introduction portion 833a and the discharge portion 833b can be constituted by a pipe or the like connected to the main body portion 831. The introduction portion 833a is connected to the cooling path CP1 (see FIG. 6) of the motor case 10 via a pipe or the like (not shown). The discharge portion 833b is connected to the radiator 82 via a pipe or the like (not shown) (see FIG. 6).

As shown in FIG. 10, the introduction portion 835a and the discharge portion 835b for the oil OL are provided below the main body portion 831 in the vertical line direction. The introduction portion 835a and the discharge portion 835b can be constituted by a pipe or the like connected to the main body portion 831. The introduction portion 835a and the discharge portion 835b extend downward in the vertical line direction from the main body portion 831 and are connected to the inclined portion 141c of the gear case 14.

As shown in FIG. 10, holes 141d and 141e are provided in the inclined portion 141c of the gear case 14. In FIG. 10, the gear case 14 is shown in cross-section for easy understanding of the holes 141d and 141e. For example, the holes 141d and 141e are formed penetrating the wall surface of the inclined portion 141c in the radial direction of the rotation axis X.

The covering 90 is provided with openings 91 and 92. The openings 91 and 92 are formed as rectangular holes penetrating the covering 90. As shown in FIG. 11, when viewed in the radial direction of the rotation axis X, the opening 91 overlaps the hole 141d, and the opening 92 overlaps the hole 141e. Since opening areas of the openings 91 and 92 are larger than opening areas of the holes 141d and 141e, when viewed in the radial direction of the rotation axis X, the openings 91 and 92 partially overlap the holes 141d and 141e, respectively. The openings 91 and 92 expose the holes 141d and 141e from the covering 90. The opening areas of the openings 91 and 92 may be the same as the opening areas of the holes 141d and 141e. In this case, when viewed in the radial direction of the rotation axis X, the entire openings 91 and 92 overlap the holes 141d and 141e.

As shown in FIG. 10, a distal end of the introduction portion 835a of the oil cooler 83 is inserted through the hole 141d exposed from the covering 90 and inserted into the gear chamber Sb. A distal end of the discharge portion 835b of the oil cooler 83 is inserted through the hole 141e exposed from the covering 90 and inserted into the gear chamber Sb. Although not shown, seal rings for preventing oil leakage may be provided in the holes 141e and 141e.

The introduction portion 835a is connected to the catch tank 15 (see FIG. 6) inside the gear case 14 via an oil passage, a pipe, or the like (not shown). The discharge portion 835b is connected to the oil hole 136a (see FIG. 3) formed in the connection wall 136 via an oil passage, a pipe, or the like (not shown).

As shown in FIG. 9, the oil cooler 83 attached to the inclined portion 141c of the gear case 14 overlaps the housing HS when viewed from the rotation axis X direction. By disposing the oil cooler 83 in such a manner, a height at which the oil cooler 83 protrudes from the housing HS in the radial direction of the rotation axis X can be reduced. This contributes to the downsizing of the entire unit 1.

As shown in FIG. 8, when viewed from the rotation axis X direction, the differential mechanism 5 (differential gear mechanism) of the power transmission mechanism 3 has a portion that overlaps the motor 2. The oil cooler 83 is positioned above a horizontal plane S (see FIG. 9) passing through the rotation axis X, which is an axis of the motor 2, and orthogonal to the vertical line direction. As shown in FIG. 8, the oil cooler 83 is positioned above the differential mechanism 5 in the vertical line direction.

In the unit 1 in which the motor 2 and the differential mechanism 5 are coaxially disposed, the layout on an upper side in the vertical line direction is less constrained than the layout on a lower side in the vertical line direction. By disposing the oil cooler 83 on an upper side of the unit 1 in the vertical line direction in which the layout is less constrained, a size of the oil cooler 83 can be increased and a surface area thereof can be secured. The oil cooler 83 as a heat exchanger tends to have a higher heat exchange rate as the surface area thereof increases.

As shown in FIG. 9, when the unit 1 is mounted on a vehicle, a vehicle room VR is disposed above a space SP in which the unit 1 is disposed. As shown in FIG. 8, the housing HS of the unit 1 is covered with the covering 90 except for regions corresponding to the opening 91 for the introduction portion 835a and the opening 92 for the discharge portion 835b of the oil cooler 83. That is, in a case where the oil cooler 83 is disposed above the unit 1 in the vertical line direction, an area of the covering 90 around the oil cooler 83 can be secured, and the noise leaking to the vehicle room VR can be reduced.

As shown in FIG. 11, when viewed in the radial direction of the rotation axis X, the main body portion 831 of the oil cooler 83 overlaps the covering 90. That is, the oil cooler 83 is exposed from the covering 90, but a portion of the housing HS overlapping the oil cooler 83 when viewed in the radial direction of the rotation axis X is covered with the covering 90. As a result, it is possible to implement both the noise countermeasure by covering the inclined portion 141c with the covering 90 and the heat countermeasure by exposing the oil cooler 83 from the covering 90.

In the openings 91 and 92 of the covering 90, the inclined portion 141c is not covered with the covering 90 and is exposed to the outside. That is, when viewed from the radial direction of the rotation axis X, the oil cooler 83 has a portion that does not overlap the covering 90 and is offset from the covering 90 in the opening portions 91 and 92.

The oil cooler 83 is provided with the introduction portion 835a and the discharge portion 835b connected to the inclined portion 141c at the portion offset from the covering 90. By offsetting the portion of the oil cooler 83 connected to the inclined portion 141c from the covering 90, an area where the oil cooler 83 is exposed from the covering 90 can be increased. By increasing the exposed area of the oil cooler 83, the heat exchange efficiency between the oil cooler 83 and the surrounding air Air (see FIG. 9) is improved, which contributes to the heat countermeasure for the housing HS. Since the main body portion 831 is separated from the inclined portion 141c, the main body portion 831 is less affected by the heat generated in the gear case 14.

Further, the introduction portion 835a and the discharge portion 835b of the oil cooler 83 overlap the openings 91 and 92 of the covering 90 when viewed in the radial direction of the rotation axis X. That is, when viewed in the radial direction of the rotation axis X, a portion connected to the inclined portion 141c of the oil cooler 83 is surrounded by the covering 90. By disposing the covering 90 so as to surround the introduction portion 835a and the discharge portion 835b exposed from the covering 90, noise leakage from the housing HS is reduced, which contributes to the noise countermeasure.

Figure 12:
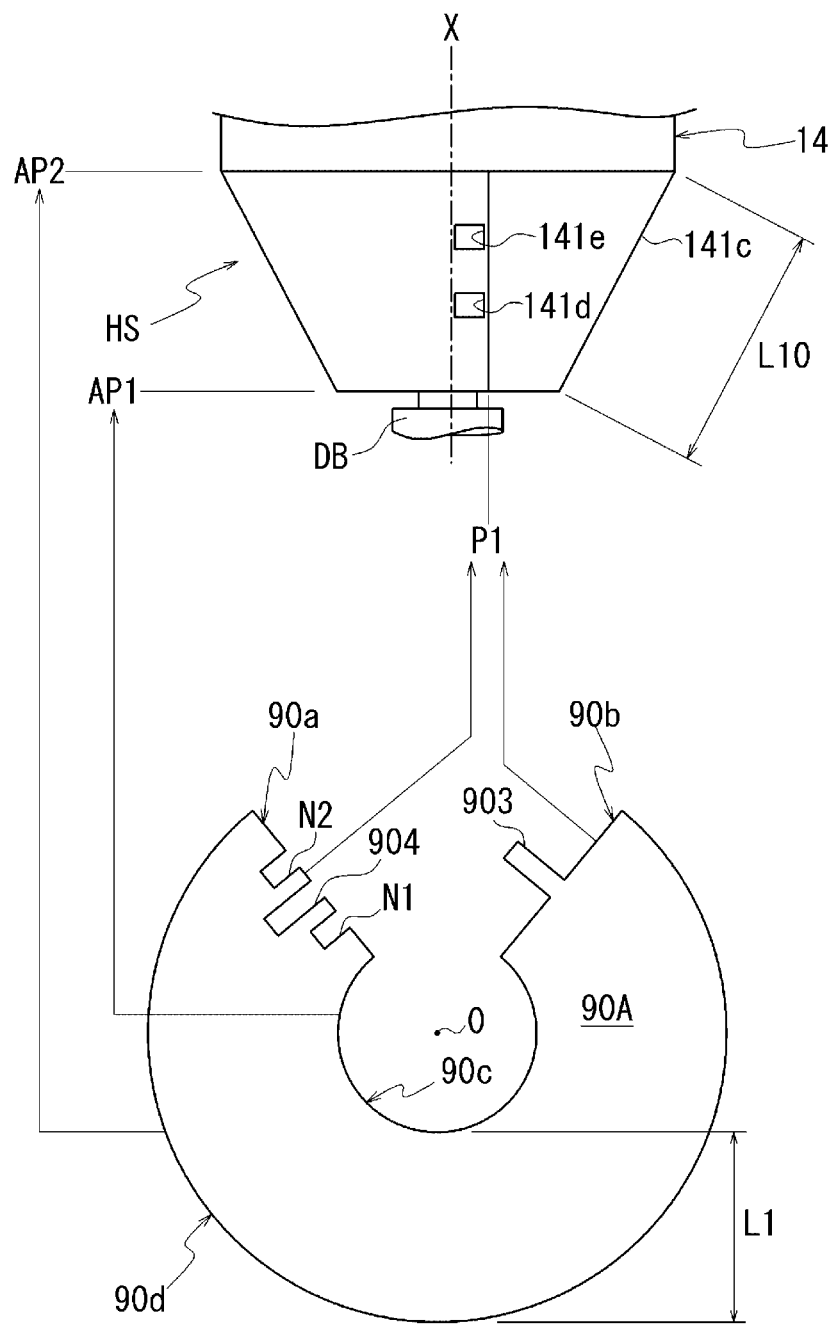
FIG. 12 is a diagram showing an example of winding a covering around the inclined portion of a gear case.

FIG. 12 is a diagram showing an example of winding the covering 90 around the inclined portion 141c of the gear case 14.

As shown in FIG. 12, the inclined portion 141c is a truncated cone-shaped portion that occupies a range from a position AP1 to a position AP2 in the rotation axis X direction of the gear case 14. The inclined portion 141c expands in diameter from the position AP1 toward the position AP2. As the covering 90 that covers the inclined portion 141c of a truncated cone shape, an annular sector sheet 90A shown in the lower part of FIG. 12 can be used.

The sheet 90A includes an arc-shaped inner edge 90c and an outer edge 90d formed concentrically with the inner edge 90c. The inner edge 90c and the outer edge 90d are connected to each other at one end 90a and the other end 90b in a circumferential direction with respect to an arc center O of the covering 90.

An arc length of the inner edge 90c corresponds to an outer diameter of the inclined portion 141c at the position AP1, and an arc length of the outer edge 90d corresponds to an outer diameter of the inclined portion 141c at the position AP2. A length L1 from the inner edge 90c to the outer edge 90d in a radial direction of the arc center O corresponds to a length L10 of the inclined surface from the position AP1 to the position AP2 of the inclined portion 141c.

The one end 90a of the sheet 90A is provided with a recess 904 and notches N1 and N2. The recess 904 is provided at the center in the radial direction of the one end 90a. The notches N1 and N2 are provided so as to sandwich the recess 904 with gaps therebetween. A convex portion 903 is provided at the center in the radial direction of the other end 90b of the sheet 90A.

The notches N1 and N2 are missing parts in which one side of four sides forming a rectangle is missing. The notches N1 and N2 are portions that form the openings 91 and 92 (see FIG. 11) of the covering 90 when the sheet 90A in wound around the inclined portion 141c.

As shown in FIG. 12, when the sheet 90A is wound around the inclined portion 141c, the inner edge 90c is aligned with the position AP1 of the inclined portion 141c, and the outer edge 90d is aligned with the position AP2 of the inclined portion 141c.

The sheet 90A is wound in the circumferential direction around the rotation axis X of the inclined portion 141c by aligning the notches N1 and N2 of the one end 90a with the holes 141d and 141e of the inclined portion 141c. At a position P1 of the inclined portion 141c in the radial direction of the rotation axis X, the other end 90b of the sheet 90A is brought into contact with the one end 90a and fixed. When the other end 90b is brought into contact with the one end 90a, the convex portion 903 is inserted into the recess 904 and fixed.

When the other end 90b comes into contact with the one end 90a, the other end 90b compensates for the missing sides of the notches N1 and N2, forming the openings 91 and 92 that are rectangular holes.

By forming the notches N1 and N2 in the sheet 90A in advance, it is not necessary to form the openings 91 and 92 in accordance with the positions of the holes 141d and 141e after winding the sheet 90A. Since the sheet 90A can be wound by aligning the notches N1 and N2 with the holes 141d and 141e, the working efficiency can be improved.

The covering 90 is not limited to a form in which a sheet is wound around the housing HS. The covering 90 may be, for example, a box having a rectangular parallelepiped shape and accommodate the housing HS therein.

The unit 1 may be disposed on a rear side of the vehicle which is less likely to be affected by the traveling wind of the vehicle. As shown in FIG. 9, the vehicle is provided with a ventilation port VP that communicates the space SP in which the unit 1 is disposed with the vehicle room VR.

By driving an air conditioner in the vehicle room VR or opening windows of the vehicle room VR, the air Air in the vehicle room VR is discharged from the ventilation port VP and flows into the space SP. The temperature of the air Air in the vehicle room VR is adjusted in accordance with the outside air temperature. For example, when the outside air temperature is high, cooling is used in the vehicle or the windows are opened. For example, when the outside air temperature is low, heating is used.

When the air Air whose temperature is adjusted according to the outside air temperature flows into the space SP, the air exchanges heat with the housing HS disposed in the space SP. As a result, on the rear side of the vehicle which is less likely to be affected by the traveling wind, the heat can be exchanged in a direction in which the temperature of the housing HS approaches the proper temperature. Further, the oil cooler 83 attached to the housing HS can also exchange heat with the air Air. Since the oil cooler 83 is disposed above the unit 1 in the vertical line direction, the oil cooler 83 is close to the ventilation port VP and easily exchanges heat with the air Air.

A fan or the like may be provided so that the air Air in the vehicle room VR easily flows into the space SP.

As described above, the unit 1 according to the embodiment has the following configuration.

(1) The unit 1 includes:
the oil cooler 83 (heat exchanger);
the housing HS configured to accommodate the power transmission mechanism 3; and
the covering 90 having a portion that covers the housing HS.

When viewed in a radial direction of the rotation axis X, the oil cooler 83 has a portion offset from the covering 90.

When viewed in the radial direction of the rotation axis X, the oil cooler 83 has a portion that overlaps the covering 90.

As a result, both a heat countermeasure and a noise countermeasure can be implemented in the housing HS.

When viewed in the radial direction of the rotation axis X, the oil cooler 83 has the main body portion 831 at a position offset from the covering 90 in the radial direction in a portion overlapping the openings 91 and 92 of the covering 90. By providing the oil cooler 83 with the main body portion 831 that is offset from the covering 90, a portion of the oil cooler 83 exposed from the covering 90 increases. By increasing the exposed portion, the air cooling efficiency at which the oil cooler 83 is cooled by the heat exchange with the air Air is improved. The improvement in the air cooling efficiency of the oil cooler 83 contributes to the improvement in the heat exchange efficiency between the oil OL and the cooling water CL in the oil cooler 83, and thus ultimately contributes to the heat countermeasure for the housing HS.

When viewed in the radial direction of the rotation axis X, the oil cooler 83 overlaps the covering 90 except for the regions of the openings 91 and 92. By providing the covering 90 so as to overlap the oil cooler 83, an area of the covering 90 covering the housing HS can be increased, which contributes to a noise countermeasure for the housing HS. The heat countermeasure by covering the housing HS with the covering 90 and the noise countermeasure by providing the oil cooler 83 can both be implemented.

(2) The housing HS includes the gear case 14 that accommodates the power transmission mechanism 3.

The covering 90 has a portion that covers the gear case 14.
The oil cooler 83 is attached to the gear case 14.

When viewed in the radial direction of the rotation axis X, the covering 90 has a portion that overlaps the power transmission mechanism 3.

The attachment of the oil cooler 83 to the gear case 14 reduces a distance between the gear case 14 and the oil cooler 83. As a result, an oil passage, a pipe, or the like for introducing the oil OL in the gear case 14 to the oil cooler 83 can be shortened.

When viewed in the radial direction of the rotation axis X, the covering 90 overlaps the power transmission mechanism 3, thereby contributing to a countermeasure against the noise generated from the power transmission mechanism 3.

(3, 4) The unit 1 includes:
the oil cooler 83;
the housing HS configured to accommodate the power transmission mechanism 3; and
the covering 90 having a portion that covers the housing HS.

When viewed in the radial direction of the rotation axis X, the oil cooler 83 has a portion offset from the covering 90.

When viewed in the radial direction of the rotation axis X, the covering 90 has a portion that overlaps the power transmission mechanism 3.

The attachment of the oil cooler 83 to the gear case 14 reduces the distance between the gear case 14 and the oil cooler 83. As a result, an oil passage, a pipe, or the like for introducing the oil OL in the gear case 14 to the oil cooler 83 can be shortened.

When viewed in the radial direction of the rotation axis X, the covering 90 overlaps the power transmission mechanism 3, thereby contributing to the countermeasure against the noise generated from the power transmission mechanism 3.

When viewed in the radial direction of the rotation axis X, the oil cooler 83 is offset from the covering 90 at a portion surrounded by the openings 91 and 92 of the covering 90. By providing the oil cooler 83 with the main body portion 831 that is offset from the covering 90, the portion of the oil cooler 83 exposed from the covering 90 increases. By increasing the exposed portion, the air cooling efficiency at which the oil cooler 83 is cooled by the heat exchange with the air Air is improved. The improved air cooling efficiency of the oil cooler 83 contributes to the heat countermeasure for the housing HS.

(5) The housing HS includes the motor case 10 configured to accommodate the motor 2.

When viewed in the radial direction of the rotation axis X, the covering 90 has a portion that overlaps the motor case 10.

The oil cooler 83 having a portion offset from the covering 90 is disposed close to the gear case 14. As a result, an area of the covering 90 covering the motor case 10 can be increased, which contributes to a countermeasure against noise on the motor case 10 side. For example, the area of the covering 90 covering the motor case 10 is preferably larger than an area of the covering 90 covering the gear case 14.

(6) When viewed in both the rotation axis X direction and the radial direction of the rotation axis X, the oil cooler 83 has a portion that overlaps the housing HS.

By attaching the oil cooler 83 to the inclined portion 141c of the gear case 14, the oil cooler 83 has a portion that overlaps the housing HS when viewed in both the rotation axis X direction and the radial direction of the rotation axis X.

In the rotation axis X direction, the gear case 14 is formed such that an outer diameter thereof decreases with increasing distance from the motor case 10. When the oil cooler 83 is disposed as described above, the oil cooler 83 does not need to protrude greatly in a radial direction and an axial direction of the housing HS, which contributes to a reduction in dimension of the unit 1.

First Modification

Figure 13:
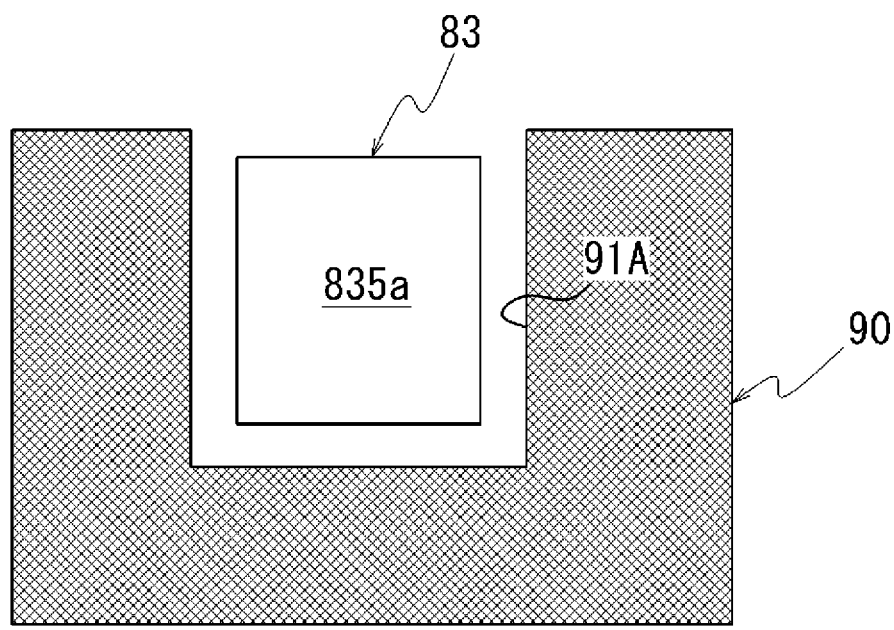
FIG. 13 is a diagram showing an example of an opening according to a first modification.

FIG. 13 is a diagram showing an example of an opening 91A according to a first modification.

Figure 14:
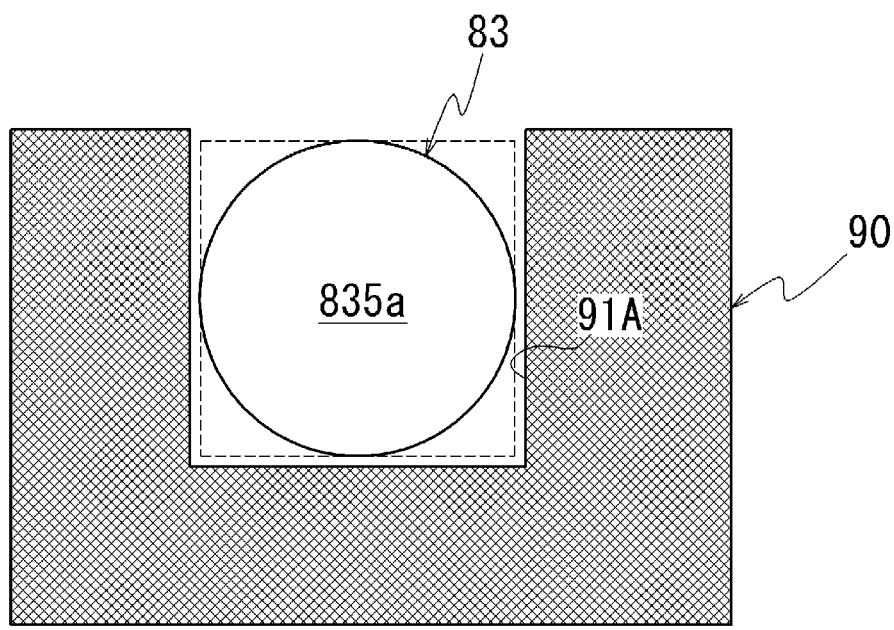
FIG. 14 is a diagram showing another example of the opening according to the first modification.

FIG. 14 is a diagram showing another example of the opening 91A according to the first modification.

FIGS. 13 and 14 are diagrams viewed from a radial direction of the rotation axis X (see FIG. 11). In FIGS. 13 and 14, to facilitate understanding, the covering 90 is cross-hatched and the oil cooler 83 is shown only in outline. In the above embodiment, although the openings 91 and 92 (see FIG. 11) of the covering 90 are holes penetrating the covering 90, the present invention is not limited thereto. The opening is a concept that includes a missing part (missing portion) in addition to a hole.

FIGS. 13 and 14 show an example of the opening 91A which is a missing part. FIGS. 13 and 14 are simplified diagrams, and for the oil cooler 83, only a frame line of the introduction portion 835a is shown.

The missing part means a shape in which one direction of the hole is missing. As shown in FIG. 13, the opening 91A, which is a missing part, has a shape surrounding three sides of the introduction portion 835a of the oil cooler 83. As shown in FIG. 14, in a case where the introduction portion 835a has a curved shape such as a circular shape or an elliptical shape, when a square (broken line in the drawing) in contact with a circumference of the introduction portion 835a is drawn, the opening 91A has a shape surrounding three sides of the introduction portion 835a.

In FIGS. 13 and 14, although the opening 91A is shown as a modification of the opening 91, the first modification is also applicable to the opening 92 (see FIG. 11).

Second Modification

Figure 15:
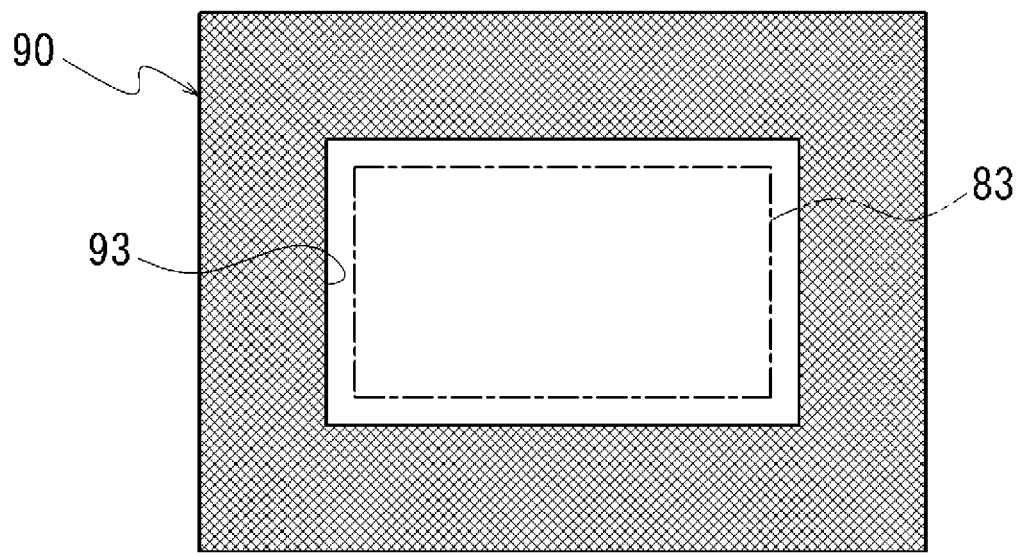
FIG. 15 is a diagram showing an example of an opening according to a second modification.

FIG. 15 is a diagram showing an example of an opening 93 according to a second modification.

Figure 16:
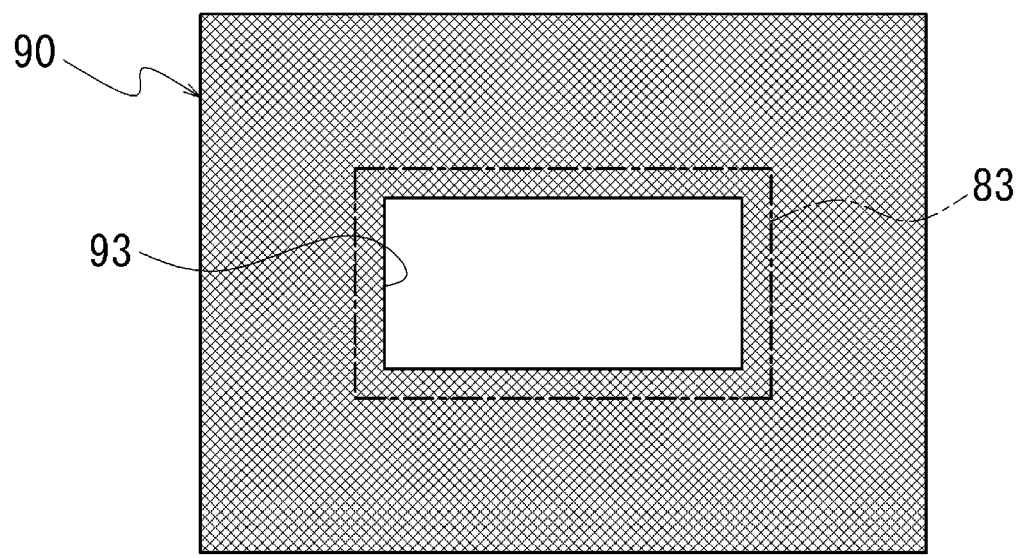
FIG. 16 is a diagram showing another example of the opening according to the second modification.

FIG. 16 is a diagram showing another example of the opening 93 according to the second modification.

In the above embodiment, the main body portion 831 of the oil cooler 83 is separated from a wall surface of the inclined portion 141c and is connected to the inside of the gear case 14 via the introduction portion 835a and the discharge portion 835b (see FIG. 10). The main body portion 831 is not limited thereto and may be directly attached to the wall surface of the inclined portion 141c. In this case as well, an exposed area of the oil cooler 83 can be increased by providing the oil cooler 83 to overlap the opening of the covering 90.

FIGS. 15 and 16 are diagrams showing an aspect of overlap between the oil cooler 83 and the opening 93 of the covering 90 in the second modification. FIGS. 15 and 16 are diagrams viewed from a radial direction of the rotation axis X (see FIG. 11). In FIGS. 15 and 16, to facilitate understanding, the covering 90 is cross-hatched and the oil cooler 83 is shown only in outline.

As shown in FIG. 15, as one aspect of the overlap, the opening 93 of the covering 90 can be provided so as to surround an outer periphery of the oil cooler 83 when viewed in the radial direction of the rotation axis X. As shown in FIG. 16, as another aspect of the overlap, the opening 93 of the covering 90 can be provided so as to be surrounded by the outer periphery of the oil cooler 83 when viewed in the radial direction of the rotation axis X.

The opening 93 of the covering 90 may be provided so as to overlap the outer periphery of the oil cooler 83 when viewed in the radial direction of the rotation axis X.

The shape of the opening 93 is not limited to a rectangle, and may be a circle, an ellipse, or the like. In this case, there are the following examples as aspects of overlap between the opening 93 and the oil cooler 83.

A circumference of the opening 93 surrounds the outer periphery of the oil cooler 83.

The circumference of the opening 93 partially overlaps the outer periphery of the oil cooler 83.

The circumference of the opening 93 is surrounded by the outer periphery of the oil cooler 83.

In the embodiment described above, although the oil OL collected by the catch tank 15 (see FIG. 3) of the gear case 14 is introduced into the oil cooler 83, the present invention is not limited thereto. The oil OL collected at other locations of the gear case 14 may be introduced into the oil cooler 83. The oil OL in the motor case 10 may be introduced into the oil cooler 83.

Although an example in which the oil OL discharged by the oil cooler 83 is introduced into the internal space Sc of the connection wall 136 has been described, the present invention is not limited thereto. The oil OL discharged by the oil cooler 83 may be supplied into the gear case 14 again or into the motor chamber Sa of the motor case 10.

In an aspect of the present invention, the power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism 5 is, for example, a bevel gear type differential gear, a planetary gear type differential gear.

The differential mechanism 5 includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is a type that is not a stepped pinion gear.

In the present embodiment, although an example in which the unit 1 according to an aspect of the present invention is mounted on a vehicle has been described, the present invention is not limited to this aspect. The present invention can be applied to other than vehicles. When a plurality of examples and modifications are described in the present embodiment, these examples and modifications may be freely combined.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority of Japanese Patent Application No. 2021-105244 filed with the Japan Patent Office on Jun. 24, 2021, all the contents of which are hereby incorporated by reference.

DESCRIPTION OF REFERENCE SIGNS 1 unit
3 power transmission mechanism
10 motor case
14 gear case
83 oil cooler (heat exchanger)
90 covering
HS housing
X rotation axis

The invention claimed is:

1. A unit comprising:
a heat exchanger;
a housing configured to accommodate a power transmission mechanism; and
a covering having a portion that surrounds the housing, wherein
the covering has an opening,
the heat exchanger has a portion that overlaps the opening when viewed in a radial direction, and
the heat exchanger has a portion that overlaps the covering when viewed in the radial direction.

2. The unit according to claim 1, wherein
the heat exchanger has a portion that overlaps the housing when viewed in both an axial direction and the radial direction.

3. The unit according to claim 1, wherein
the housing includes a gear case configured to accommodate the power transmission mechanism,
the covering has a portion that covers the gear case,
the heat exchanger is attached to the gear case, and
the covering has a portion that overlaps the power transmission mechanism when viewed in the radial direction.

4. The unit according to claim 3, wherein
the housing includes a motor case configured to accommodate a motor, and
the covering has a portion that overlaps the motor case when viewed in the radial direction.

5. A unit comprising:
a heat exchanger;
a housing configured to accommodate a power transmission mechanism; and
a covering having a portion that surrounds the housing, wherein
the covering has an opening,
the housing includes a gear case configured to accommodate the power transmission mechanism,
the heat exchanger has a portion that overlaps the opening when viewed in a radial direction,
the covering has a portion that overlaps the gear case when viewed in the radial direction, and
the heat exchanger has a portion that overlaps the gear case when viewed in both an axial direction and the radial direction.

6. The unit according to claim 5, wherein
the housing includes a motor case configured to accommodate a motor, and
the covering has a portion that overlaps the motor case when viewed in the radial direction.

7. The unit according to claim 5, wherein
the housing includes a motor case configured to accommodate a motor, and
the heat exchanger does not overlap the motor case when viewed in the radial direction.

* * * * *